United States Patent
Adey et al.

(10) Patent No.: US 10,697,990 B2
(45) Date of Patent: Jun. 30, 2020

(54) ANALYTICAL SYSTEM FOR PERFORMING LABORATORY PROTOCOLS AND ASSOCIATED METHODS

(75) Inventors: Nils B. Adey, Salt Lake City, UT (US); Rob Perry, Park City, UT (US)

(73) Assignee: LEICA BIOSYSTEMS RICHMOND, INC., Richmond, IL (US)

( * ) Notice: Subject to any disclaimer, the term of this patent is extended or adjusted under 35 U.S.C. 154(b) by 889 days.

(21) Appl. No.: 13/695,081

(22) PCT Filed: Apr. 29, 2011
(Under 37 CFR 1.47)

(86) PCT No.: PCT/US2011/034527
§ 371 (c)(1),
(2), (4) Date: Oct. 29, 2012

(87) PCT Pub. No.: WO2011/139888
PCT Pub. Date: Nov. 10, 2011

(65) Prior Publication Data
US 2013/0048089 A1    Feb. 28, 2013

Related U.S. Application Data

(60) Provisional application No. 61/329,499, filed on Apr. 29, 2010.

(51) Int. Cl.
*G01N 1/31* (2006.01)
*G01N 35/00* (2006.01)
*G01N 35/10* (2006.01)

(52) U.S. Cl.
CPC ............ *G01N 35/10* (2013.01); *G01N 1/312* (2013.01); *G01N 35/00029* (2013.01);
(Continued)

(58) Field of Classification Search
CPC combination set(s) only.
See application file for complete search history.

(56) References Cited

U.S. PATENT DOCUMENTS

| | | |
|---|---|---|
| 5,104,621 A | 4/1992 | Pfost et al. |
| 5,167,615 A | 12/1992 | East et al. |

(Continued)

FOREIGN PATENT DOCUMENTS

| | | |
|---|---|---|
| EP | 0434592 A1 | 6/1991 |
| JP | 2011-007496 A | 1/2011 |

(Continued)

OTHER PUBLICATIONS

Steven Q. Irvine "Whole-mount in situ hybridization of small invertebrate embryos using laboratory mini-columns" Bio Techniques. vol. 43, No. 6, 2007. pp. 764-768.

*Primary Examiner* — Christopher Adam Hixson
*Assistant Examiner* — Michelle Adams
(74) *Attorney, Agent, or Firm* — Preti Flaherty Beliveau & Pachios LLP

(57) ABSTRACT

Systems, devices, and methods for automating laboratory protocols utilizing cooperative efforts between differing components including fluidics, agitation and thermal control for processing a wide variety of disparate laboratory protocols are provided. In one aspect, a sample processing module is provided, including a housing configured to accommodate a pre-identified sample process, a temperature input capable of interfacing with a temperature controller, a fluid input capable of interfacing with an input fluid controller, a fluid output capable of interfacing with an output fluid controller, and a standardized agitation connector capable of interfacing with an agitator. A control system interfaces with the temperature input, fluid input, fluid output, and agitation connector to enable the system to (Continued)

perform laboratory protocols that require complex, sequential fluidic steps in association with the temperature and agitation control.

13 Claims, 18 Drawing Sheets

(52) U.S. Cl.
CPC ............ *G01N 2035/00138* (2013.01); *G01N 2035/00326* (2013.01); *G01N 2035/00346* (2013.01); *Y10T 137/0318* (2015.04)

(56) References Cited

U.S. PATENT DOCUMENTS

| | | | |
|---|---|---|---|
| 5,231,029 A | 7/1993 | Wootton et al. | |
| 5,437,838 A | 8/1995 | DeMoranville et al. | |
| 5,443,791 A | 8/1995 | Cathcart et al. | |
| 5,625,706 A | 4/1997 | Lee et al. | |
| 5,637,208 A | 6/1997 | Dourdeville | |
| 5,674,006 A | 10/1997 | Islam et al. | |
| 5,695,720 A | 12/1997 | Wade et al. | |
| 5,897,781 A | 4/1999 | Dourdeville | |
| 5,993,654 A | 11/1999 | Black | |
| 6,180,061 B1 | 1/2001 | Bogen et al. | |
| 6,212,705 B1 | 4/2001 | Kramer | |
| 6,235,479 B1 | 5/2001 | Rogers | |
| 6,238,910 B1 | 5/2001 | Custance et al. | |
| 6,296,809 B1 | 10/2001 | Richards et al. | |
| 6,432,696 B2 | 8/2002 | Custance et al. | |
| 6,485,913 B1 | 11/2002 | Becker et al. | |
| 6,607,907 B2 | 8/2003 | McNeely et al. | |
| 6,615,856 B2 | 9/2003 | McNeely et al. | |
| 6,637,463 B1 | 10/2003 | Lei et al. | |
| 6,663,353 B2 | 12/2003 | Lipscomb et al. | |
| 6,793,890 B2 | 9/2004 | Morales et al. | |
| 6,810,805 B1 | 11/2004 | Atwater | |
| 6,827,901 B2 * | 12/2004 | Copeland | B01F 5/0057 422/62 |
| 6,881,579 B2 | 4/2005 | Hilson et al. | |
| 7,013,978 B2 | 3/2006 | Appleford et al. | |
| 7,056,477 B1 | 6/2006 | Schwalbe et al. | |
| 7,223,363 B2 | 5/2007 | McNeely et al. | |
| 7,235,400 B2 | 6/2007 | Adey | |
| 7,358,078 B2 | 4/2008 | Chen et al. | |
| 7,390,458 B2 | 6/2008 | Burow et al. | |
| 7,468,161 B2 | 12/2008 | Reinhardt et al. | |
| 7,557,070 B2 | 7/2009 | Ravkin et al. | |
| 7,612,020 B2 | 11/2009 | Stuelpnagel et al. | |
| 7,614,857 B2 | 11/2009 | Fuechslin et al. | |
| 7,964,413 B2 | 6/2011 | Macioszek et al. | |
| 7,985,375 B2 | 7/2011 | Edens et al. | |
| 8,061,630 B2 | 11/2011 | Utz | |
| 8,501,115 B2 * | 8/2013 | Adey | G01N 1/312 422/500 |
| 2001/0046700 A1 | 11/2001 | Custance | |
| 2005/0239195 A1 | 10/2005 | Oram et al. | |
| 2006/0088451 A1 | 4/2006 | Nakamima et al. | |
| 2006/0141635 A1 | 6/2006 | Taneike | |
| 2008/0014576 A1 | 1/2008 | Jovanovich et al. | |
| 2008/0247914 A1 | 10/2008 | Edens et al. | |
| 2009/0008405 A1 | 1/2009 | Mathus et al. | |
| 2009/0275113 A1 | 11/2009 | Maltezos et al. | |
| 2009/0305337 A1 * | 12/2009 | Iqbal | G01N 1/30 435/40.52 |
| 2010/0113288 A1 | 5/2010 | Adey et al. | |
| 2010/0167943 A1 | 7/2010 | Adey et al. | |
| 2010/0200021 A1 | 8/2010 | Adey et al. | |
| 2010/0291536 A1 | 11/2010 | Viljoen et al. | |
| 2010/0330659 A1 * | 12/2010 | Poulsen | G01N 1/2813 435/283.1 |

FOREIGN PATENT DOCUMENTS

| | | | |
|---|---|---|---|
| WO | WO95/05590 | 3/1995 | |
| WO | WO 2009/034783 A1 | 3/2009 | |
| WO | WO-2009074154 A2 * | 6/2009 | ............ G01N 1/30 |
| WO | WO 2010/048631 | 4/2010 | |
| WO | WO 2010/048631 A2 | 4/2010 | |
| WO | WO 2010/132756 A2 | 11/2010 | |

* cited by examiner

ANALYTICAL SYSTEM FOR PERFORMING LABORATORY PROTOCOLS AND ASSOCIATED METHODS

CROSS-REFERENCE TO RELATED APPLICATIONS

This application claims the benefit under 35 U.S.C. § 119(e) of U.S. Provisional Patent Application No. 61/329,499, filed Apr. 29, 2010, the disclosure of which is incorporated by reference herein.

FIELD OF THE INVENTION

The present invention relates generally to systems, devices, and methods for performing laboratory protocols and associated methods. Accordingly, the present application involves the fields of biology, physics, and chemistry.

BACKGROUND

A large number of analytical methods and tools exist today in the scientific work place that can be used for testing samples of a wide variety. Examples of such tools include various forms of chromatography, Polymerase Chain Reaction (PCR), micro array hybridizations, flow cytommetry, etc., utilize a number of different equipment types. While the equipment in support of such testing has come into being and greatly evolved over recent years, many short comings and challenges still exist.

SUMMARY

The present invention provides systems, devices, and methods for automating laboratory protocols which utilize cooperative efforts between various differing components including fluidics, agitation, and thermal control in order to expand and optimize analytical capacity. In some aspects, one or more of each component can be varied in order to customize the devices and systems of the present invention for the performance of particular analyses. Fluidics, agitation, and temperature may all be varied both in quantity and type in order to provide a customized automated analysis. In yet some additional aspects, modular processing components may be used to allow systems to be reconfigured for processing a wide variety of disparate laboratory protocols and analytical methods. In one aspect, for example, a sample processing module is provided. Such a module can include a housing configured to accommodate a pre-identified sample process, a temperature input capable of interfacing with a temperature controller, a fluid input capable of interfacing with an input fluid controller, a fluid output capable of interfacing with an output fluid controller, and an agitation connector capable of interfacing with an agitator. These components may also be standardized to provide interchangeability of a given module with a different module having a housing configured to accommodate the same or a different pre-identified sample process in a sample processing system.

The flexibility offered by the fluidics components of the present invention aid in providing the system with an ability to perform a wide variety of laboratory protocols, including protocols that require an extended period of time to perform. For example, in one aspect, the fluid input system can draw fluid from a variety of reservoirs and deliver a designated fluid to any one or a plurality of sample processing modules. Similarly, the fluid output system can drain fluid from any one or a plurality of sample processing modules and deliver the fluid to one or more locations.

The individual systems can also complement each other and aid in their respective functions. For example, coordinating control of the agitator with control of the input fluid controller during delivery of a fluid into the sample processing module can aid filling. Similarly, coordinating control of the agitator with control of the output fluid controller during draining of a fluid from the sample processing module can aid draining. Moreover, these two functions can be performed simultaneously. For example, the filling of one sample processing module can be simultaneous with the draining of another sample processing module, or the filling of one internal space can be simultaneous with the draining of another internal space within the same sample processing module. Thus, the filling and draining of all sample processing modules, or associated internal spaces, can be accomplished sequentially and more efficiently.

In addition to the foregoing parameters of fluidics, agitation, and temperature, in some aspects, the sample processing modules themselves can contain variable components. For example, in one aspect, the housing of the module includes an internal space to accommodate the pre-identified sample process. In a more specific aspect, the module can further include a sample process insert configured to be inserted into the internal space. For example, the module can further include a pair of slide holder clips attached to the module and extending down into the internal space so that a sample insert, such as a microscope slide, can be oriented substantially parallel to the bottom of the internal space. Thus for a given module, the sample process insert can be interchangeable to allow further variability. Non-limiting examples of sample process inserts can include a microscope slide, a microarray, a sample basket, a blot, a filter, an ELISA insert, and the like, including combinations thereof.

Furthermore, the module can accommodate a variety of sample processes, and nearly any sample process that is capable of being automated is considered to be within the present scope. Non-limiting examples of sample processes include in situ hybridizations such as fluorescent in situ hybridization (FISH) and whole mount in situ hybridization (WISH), blots such as Western blots, Northern blots, and Southern blots, slide processing, immunohisto chemistry reactions, histopathology reactions, antibody assays, electrophoresis, restriction analysis, ligation, labeling, labeling reactions for large or medium scale probe synthesis, DNA/RNA/microRNA labeling reactions, filter-based assays, and the like, including combinations thereof.

The present invention additionally provides systems for performing a laboratory protocol. In one aspect, such a system can include at least one sample processing module as described herein. The system can include a temperature control system interfaced with the standardized temperature input and configured to regulate temperature of the pre-identified sample process, an input fluid controller interfaced with the standardized fluid input and configured to deliver fluid to the pre-identified sample process, and an agitator interface with the sample processing module and configured to provide agitation to the pre-identified sample process. Additionally, a control system can be interfaced with the temperature control system, the input fluid controller, and the agitator, and configured to control temperature, fluidics, and agitation of the pre-identified sample process. In another aspect, the at least one sample processing module is a plurality of sample processing modules. In yet another aspect, at least two of the plurality of sample processing modules have a different pre-identified sample process. In another aspect of the invention, each of the pre-identified sample process for each sample processing module is the same.

DETAILED DESCRIPTION

Figure 1:
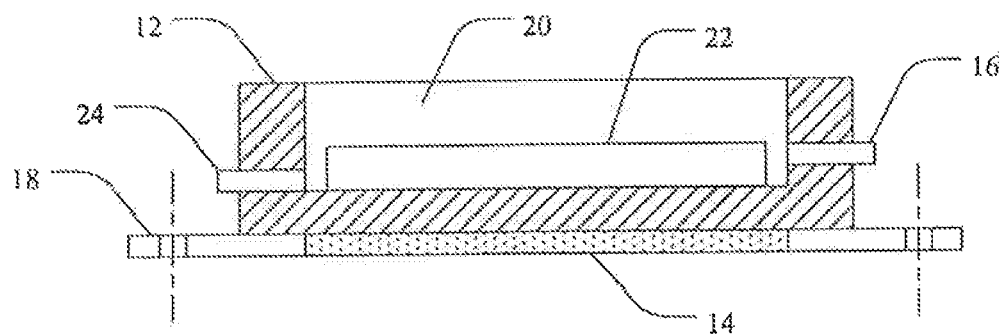
FIG. 1 is a cross-sectional view of sample processing module in accordance with one embodiment of the present invention.

The disclosure of U.S. Provisional Patent Application No. 61/329,499, filed Apr. 29, 2010, is incorporated by reference herein.

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise. Thus, for example, reference to "a buffer" includes one or more of such buffers, and reference to "the chemical" includes reference to one or more of such chemicals.

Definitions

In describing and claiming the present invention, the following terminology will be used in accordance with the definitions set forth below.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of particles would either completely lack particles, or so nearly completely lack particles that the effect would be the same as if it completely lacked particles. In other words, a composition that is "substantially free of an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

The Invention

The present invention provides systems, devices, and methods for automating laboratory protocols that utilize cooperative efforts between various differing components, including fluidics, agitation, and thermal control in order to expand and optimize analytical capacity. By so doing, the range of analyses that are possible is increased while the consistency provided by to the automation is maintained. In some aspects, one or more of each component can be varied in order to customize the devices and systems of the present invention for the performance of particular analyses. Fluidics, agitation, and temperature may all be varied both in quantity and type in order to provide a customized automated analysis.

In one aspect of the present invention, a sample processing module is provided. As is shown in FIG. 1, for example, a sample processing module can include a housing 12 configured to accommodate a pre-identified sample process, a temperature input 14 capable of interfacing with a temperature controller, a fluid input 16 capable of interfacing with an input fluid controller, a fluid output 24 capable of interfacing with an output fluid controller, and an agitation connector 18 capable of interfacing with an agitator. The temperature input 14, fluid input 16, fluid output 24 and agitation connector 18 may also be standardized between sample processing modules. The standardized components provide interchangeability of the module with a module having a housing configured to accommodate a different pre-identified sample process in a sample processing system. In other words, the various connections and fittings are designed to allow a module having a given sample process to be replaced by a module having a different sample process, while allowing the standardized components to interface with the proper components of the system.

In yet some additional aspects, modular processing components may allow systems to be reconfigured for processing a wide variety of disparate laboratory protocols. A modular system integrating various modules for performing various portions of a laboratory protocol can often increase the efficiency, accuracy, and consistency of lab work. A variety of modules and components are contemplated, and it should be understood that a given collection of modules and components can vary depending on the protocol being performed and any preferences of the individual performing the procedures. The sample processing modules can differ in form and function, but share common attachment points, connections, and mechanisms, such that they can be readily interchanged. One advantage of such a system is the ease and convenience of operation and reconfiguration. Modules can be easily swapped out and replaced as they wear out, or as protocol conditions change. Equipment upgrades can be accomplished by merely switching old modules for updated modules, thus reducing the need to purchase an entirely new system. Additionally, system setups for different protocols can merely entail switching modules and reagents.

In another aspect, the housing includes an internal space 20 to accommodate the pre-identified sample process. Such an internal space allows the introduction and retention of fluids around a sample for the performance of a laboratory protocol. Thus fluid reagents, fluid washes, buffers, and the like can be contained within the internal space during heating, cooling, agitation, or any other protocol step. Furthermore, the internal space can receive and contain a sample process insert 22 during the laboratory protocol. Sample process inserts can provide further variability to the system, allowing further flexibility in the types of laboratory protocols to be performed using one type of sample module. The present scope should include any type of sample insert configured to be received into the internal space. Non-limiting examples of such inserts can include microscope slides, microarrays, sample baskets, blots, filter, ELISA inserts, and the like, including any combinations thereof.

It is contemplated that numerous sample processes can be performed using the modules according to aspects of the present invention, and any sample process that can be performed in a module is considered to be within the present scope. A sample process can be a laboratory protocol, or a portion of a laboratory protocol. In other words, in one aspect, a sample process can encompass all of or substantially all of a laboratory protocol. As such, a sample can be introduced into a module, and a laboratory protocol can be performed thereon from start to finished product. In another aspect, a sample process can encompass a portion of a laboratory protocol. For example, a sample process can be merely a series of wash and reaction steps that are only a part of a laboratory protocol, the rest of which is performed outside of a sample module. In another aspect, a sample process that is a first portion of a laboratory protocol can be performed in one sample module, and a different sample process that is a second portion of the laboratory protocol can be performed in a different sample module. Non-limiting examples of sample processes can include in situ hybridizations such as fluorescent in situ hybridization (FISH) and whole mount in situ hybridization (WISH), blots such as Western blots, Northern blots, Southern blots, slide processing, immunohisto chemistry reactions, histopathology reactions, antibody assays, gel electrophoresis, restriction analysis, ligation, labeling, filter-based assays, and the like, including combinations thereof. In one specific aspect, the sample process can be a FISH process. In another specific aspect, the sample process can be a WISH process.

Returning to FIG. 1, the fluid input 16 is configured to allow fluid to enter the internal space 20 of the sample processing module from the input fluid controller. In one aspect, the fluid input can be a coupling, fitting, channel, or other fluidic structure that penetrates the housing 12 of the sample module. In such cases, the input fluid controller can be coupled to the coupling, fitting, channel or other fluidic structure directly or via fluidic tubing in order to provide fluid to the internal space. In one specific aspect, the fluid input is configured to fluidically couple with a fluid line, and the input fluid controller is a pump system. In another aspect, the fluid input can be an open receptacle of the sample module, and the input controller can be a pipette (not shown). In those aspects wherein the housing has an internal space, the open receptacle can be an open portion of the housing providing access to the internal space.

The sample processing module can also include a fluid output 24 capable of interfacing with an output fluid controller. In one aspect, the fluid output can be a coupling, fitting, channel, or other fluidic structure that penetrates the housing 12 of the sample processing module. In such cases, the output fluid controller can be coupled to the coupling, fitting, channel or other fluidic structure directly or via fluidic tubing in order to remove fluid from the internal space. In one specific aspect, the fluid output is configured to fluidically couple with a fluid line, and the output fluid controller is a pump system, or any other system that provides a vacuum force to the fluid line. In some cases, gravity or capillary forces can be used in lieu of a pump to draw fluid from the internal space. In another aspect, the fluid output can be an open receptacle of the sample module, and the output controller can be a pipette (not shown). In those aspects wherein the housing has an internal space, the open receptacle can be an open portion of the housing providing access to the internal space.

Various configurations for the temperature input 14 are contemplated, and any temperature input capable of regulating the temperature of the sample process should be considered to be within the present scope. The temperature input is a thermally conductive area of the sample processing module that is capable of interfacing with a temperature controller in order to regulate the temperature of the sample process. In those aspects having an internal space, the temperature input is configured to provide temperature regulation to the internal space. In one aspect, the temperature input can be a thermally conductive material associated with the housing in a position that allows thermal regulation to occur. The material of the temperature input can be any thermally conductive material, such as, for example, materials that can be used in common heat spreaders. Various metals can be used, such as aluminum, copper, or any other thermally conductive metal, including associated alloys. Additionally, thermally conductive non-metals can also be utilized. Non-limiting examples include diamond-like carbon, graphite materials, and the like.

In one aspect, the heating and/or cooling element can reside in the temperature input 14, and the temperature controller can merely control the heating and/or cooling element. One non-limiting example of such elements includes one or more Peltier elements thermally coupled to a heat spreading surface. Thus the temperature controller provides electrical input to the Peltier elements in order to regulate heating or cooling of the sample processing module. In the case of a Peltier device, current delivered thereto causes one side of the device to heat and the other side to cool. Reversing the polarity of the current causes a reversal in which side is heated and which side is cooled. Thus by coupling such devices to the temperature input, the sample processing module temperature can be controlled. Such control can include maintaining a given temperature during a reaction, providing heating or cooling to the reaction, cycling the temperature during the reaction, and the like. Fans can be associated with the Peltier elements to dissipate heat or cold from the side of the Peltier device that is not controlling the temperature of the reaction. For example, if the sample processing module is being cooled, the downward side becomes hot, and thus the fans function to cool the non-functional side of the Peltier. Thermal fins can also be associated with the Peltier materials to assist in this thermal regulation. It should also be noted that the thermal cooling devices can function dependently to control temperature uniformly across all of the sample modules, or they can function independently to control temperature differently for different sample modules. In another aspect, the heating and/or cooling element can reside in the temperature controller. In this case, heating and/or cooling are generated at the temperature controller and thermally transferred to the temperature input. Such heating and cooling can occur by any know technique, such as Peltier elements, conductive heat elements, convective heat elements, fluidic heat elements, and the like.

The housing 12 of the sample processing module can be made from a variety of materials. The interface between the sample process and the housing should be substantially inert with respect to the sample process. As such, the housing material itself can be substantially inert, or a coating can be applied to any surfaces of the housing or internal space that will come in contact with the materials of the sample process. Generally, however, the housing can be made from metals, such as aluminum, copper, stainless steel, nickel, and alloys thereof, from polymeric materials, ceramics, and the like. Coatings for protective purposes can include modified surfaces such as anodized layers on an aluminum surface, or polymeric or other inert coatings that can provide adequate protection between the housing material and the sample process.

The sample processing module also includes at least one agitation connector that functions to provide a secure coupling between the sample processing module and an agitator. A variety of agitation connectors are contemplated, and any method of securing the sample processing module to an agitator should be considered to be within the present scope. For example, as is shown in FIG. 1, the agitation connector 18 can be holes in the housing to allow the housing to be bolted or otherwise secured to the agitator. Other examples can include clips, elastomeric materials, magnetic forces, etc. In one specific example, the agitation connector can be a plurality of holes in the housing and a plurality of bolts or screws.

Figure 2:
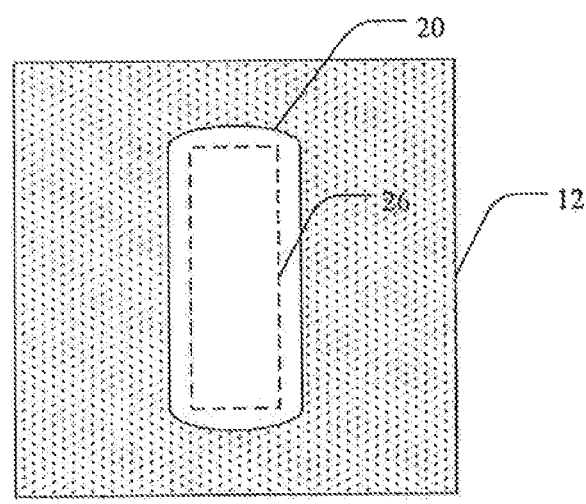
FIG. 2 is a top view of one configuration for a sample processing module having a single open space sufficient to hold a microscope slide in accordance with one embodiment of the present invention.

Various physical configurations of sample processing modules are contemplated in order to accommodate a wide variety of sample processes. Numerous aspects of sample processing modules include internal spaces utilized for processing samples in a volume of fluid. Separate sample processing modules can have housings that are configured to have internal spaces that are the same with respect to each other, or they can be configured to have the internal spaces different with respect to each other. As one example, FIG. 2 shows a housing 12 having an internal space 20. The internal space is sized, in this case, to hold a single sample process insert 26 such as a microscope slide. Thus the housing would include the components discussed above (not shown) that would provide fluid, heat, and agitation to the internal space to process the sample contained on the microscope slide. Non-limiting examples of sample processes that can be performed using a microscope slide or similar structure include FISH processing, including prehybridization, hybridization, and post hybridization steps, Hematoxylin and Eosin (H&E) staining, slide processing in immunohistochemistry, immuno-histopathology, and immuno-cytochemistry, microarrays, sectional in situ hybridization, and the like. Additionally, any sample process using an open bath-type protocol can be processed using such a module. Examples can include post gel or post blot processing, such as with Western, Southern, and Northern blots. As has been described, a sample insert containing sample baskets can also be used in the internal space to process embryos and other small tissue sections, such as would be the case with WISH processing.

Figure 3:
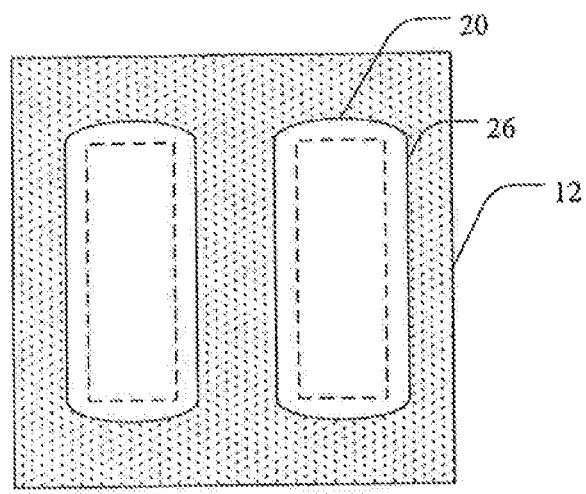
FIG. 3 is a top view of one configuration for a sample processing module having two open spaces sufficient to hold each hold a single microscope slide for tandem or serial processing in accordance with one embodiment of the present invention.
Figure 4:
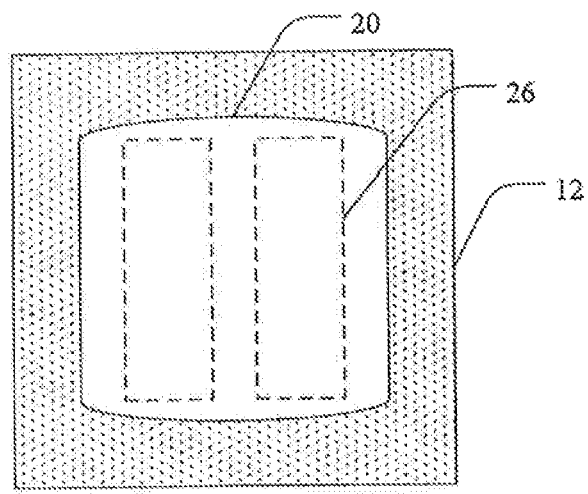
FIG. 4 is a top view of another configuration for a sample processing module having one open space sufficient to hold two microscope slides for simultaneous processing in accordance with one embodiment of the invention.

FIG. 3 shows a sample processing module having a housing 12 and two internal spaces 20 for processing two sample process inserts 26. Thus two processes can occur in the same module having essentially the same heating and agitation inputs. These two samples can be processed with or without similar fluid characteristics, however. FIG. 4 shows a sample processing module having a housing 12 and a single internal space 20 that is sized such that multiple sample process inserts 26 can be processing concurrently in the same internal space. A larger internal space can also be utilized to accommodate larger blot or gel materials. It is also contemplated that a module housing can have multiple internal spaces, where each internal space can process multiple sample process inserts simultaneously. Sample processing modules can also be configured to accommodate electrophoretic gels, well plates, ELISA slide, PCR media, and the like.

It is also contemplated that a sample processing module insert can be introduced into the internal space of a sample processing module, and that the insert can provide an added level of diversity. For example, an open bath type module can have an internal space that is configured to receive and horizontally process one or more microscope slides. This internal space can be used to process slides, blots, or other media that can be processed using an open bath. An insert can be introduced into the internal space that modifies this functionality. As one example, an insert comprising a support holding one or more baskets can be used to perform embryo or other tissue protocols such as WISH processing. In another example, an insert having a plurality of vertically positioned microscope slides can be inserted into the internal space to simultaneously process multiple slides in a vertical orientation.

Figure 5A:
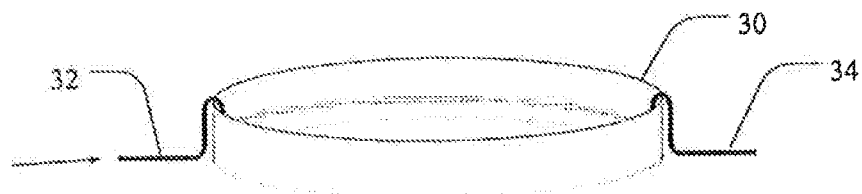
FIGS. 5a-b are perspective views of yet another configuration for sample processing modules having an circular shape dish-type area for receiving samples to be processed in 15 accordance with yet another embodiment of the present invention.
Figure 5B:
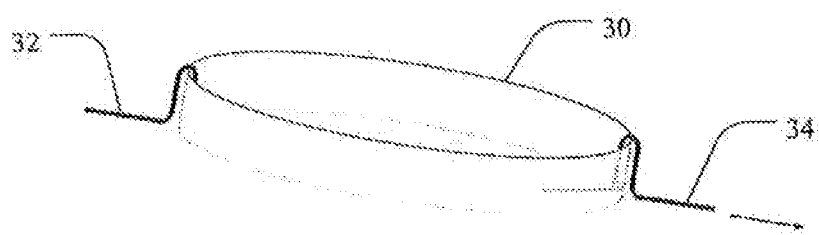

In another aspect, as is shown in FIGS. 5a and 5b, the sample processing module can be a dish 30 such as, for example, a cell culture. The module can include a fluid input clip 32 and a fluid output clip 34. The dish 30 can be filled with fluid from the fluid input clip 32 and subsequently emptied by the fluid output clip 34. FIG. 5b shows the dish 30 in a tilted configuration to facilitate the removal of fluid from the dish 30.

Figure 6:
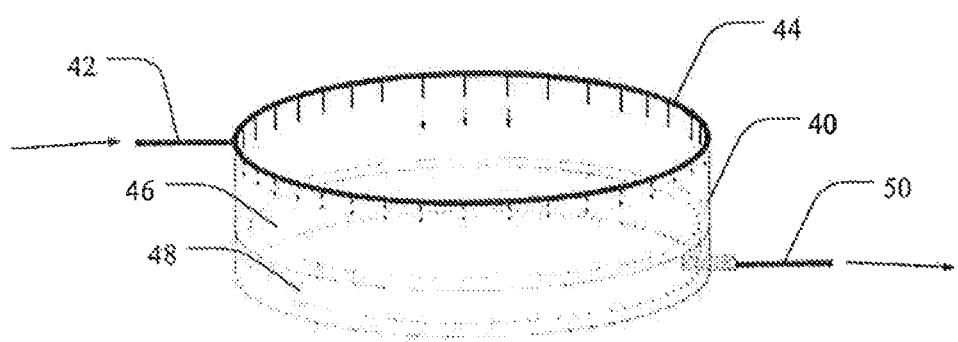
FIG. 6 is a perspective view of a configuration for the sample processing module that includes a filter in accordance with an additional embodiment of the present invention.

In yet another aspect, as is shown in FIG. 6, the sample processing module can be a filtering module 40 for filtering, for example, a sample liquid. The filter module 40 can include a fluid input 42 having a fluid distribution ring 44 around the fluid module to more evenly distribute the fluid. The fluid passes through a filter 46, into a fluid catch reservoir 48, and out of a fluid output 50. The sample being processed can be the fluid being filtered or it can be the filter itself, and the fluid is merely a wash step of a laboratory protocol.

As has been described, a sample processing module can be used for a WISH laboratory protocol. A variety of configurations are contemplated, including sample processing modules specific to WISH and WISH inserts to be inserted into an open bath sample process module. One feature of either aspect can include WISH baskets to hold embryos or tissue. A WISH basket can include a screen portion to allow fluid flow to access the WISH sample. The screen can typically be from about 50 to about 150 mesh. The basket can be entirely or partially made of a screen material to allow fluid access. When agitation is applied, the rocking motion allows the fluid within the WISH module to wash the sample. Thus the WISH basket is designed such that fluid can enter from the outside of the basket. In one aspect, the bottom of the basket can be made from a screen material. Thus as fluid enters and rises up and down inside the WISH basket, the sample is maintained in suspension while providing a gentile agitation.

Figure 7:
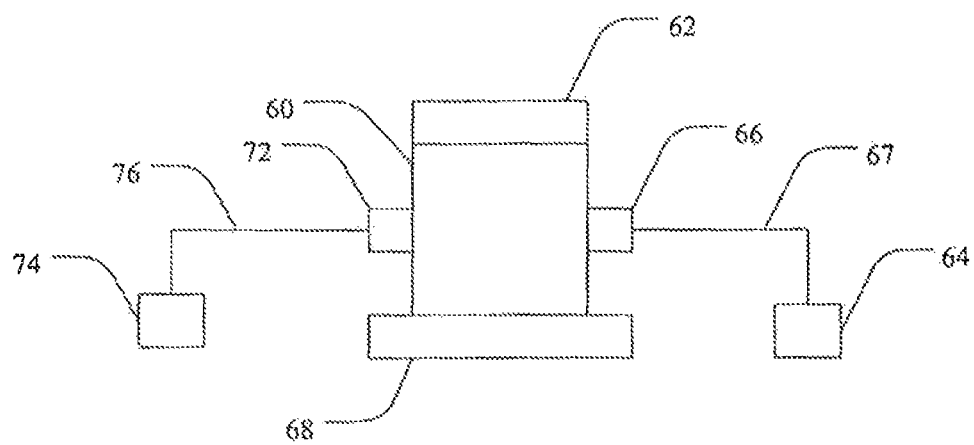
FIG. 7 shows a schematic diagram of a sample processing system and method for performing laboratory protocols in accordance with one embodiment of the present invention.

The present invention additionally provides systems for performing laboratory protocols. These systems can incorporate one or more sample processing modules to process one or more laboratory protocols concurrently. In one aspect, as is shown schematically in FIG. 7, a system can include at least one sample processing module 60, and a temperature control system 62 interfaced with the temperature input (not shown) of the sample processing module and configured to regulate temperature of the pre-identified sample process. The system can also include an input fluid controller 64 interfaced with the fluid input 66 and configured to deliver fluid via an input fluid line 67 to the sample processing module. The fluid can be withdrawn from a fluid reservoir (not shown) by the output fluid controller 74. An agitator 68 is interfaced with the sample processing module 60 and configured to provide agitation, and a control system (not shown) is interfaced with the temperature control system 62, the input fluid controller 64, the output fluid controller 74, and the agitator 68, and is configured to control temperature, fluidics, and agitation of the sample processing module. It should also be noted that in some aspects multiple sample processing modules can be concurrently utilized in the system. Furthermore, in some aspects, multiple sample processing modules that are concurrently used can have a different pre-identified sample process. In these cases, the system can be modular in nature, allowing sample processing modules with standardized temperature, agitation, and fluid inputs to be used. Such configurations add substantially to the versatility of the system as a whole.

The system can additionally include a fluid output 72 associated with the sample processing module 60 and interfaced with an output fluid controller 74. The fluid output 72 and the output fluid controller are configured to remove fluid from the sample processing module via an output fluid line 76. In one aspect, output fluid controller can deliver the output fluid to a waste container (not shown).

Figure 7A:
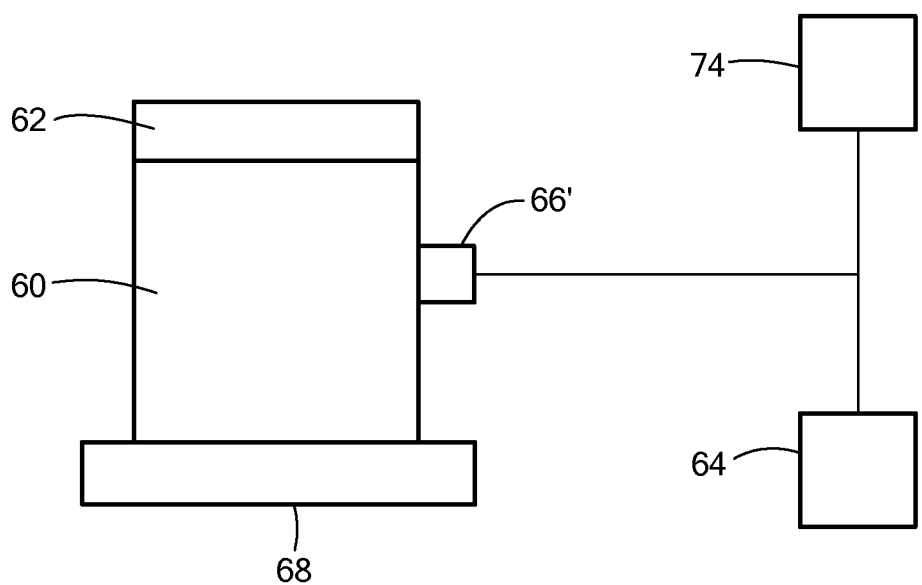
FIG. 7A shows a schematic diagram of a sample processing system and method for performing laboratory protocols in accordance with one embodiment of the present invention.

FIG. 7A illustrates a further aspect in which a single fluid connection 66' is provided for both fluid input and output to the processing module 60. Fluid flow through the connection 66' is bi-directional. The fluid input controller 64 and the fluid output controller 74, which can each be, for example, a pumping mechanism, determine whether fluid is delivered into or out of the processing module 60. A manifold device can also be provided, for example, at the T intersection of the conduits connected to the input controller 64 and the output controller 74 to control distribution of the fluid in the system.

The system, in any of the aspects and/or embodiments, can include a variety of input fluidics. In general, the input fluidics should include all components that are necessary to move fluid from a fluid reservoir into the sample processing module. Thus the standardized fluid input associated with the sample processing module can include couplings, fittings, channels, pipes, open receptacles, and any other technique or device to associate fluidics with the module. The input fluid controller removes fluid from a fluid reservoir and transfers that fluid into the sample processing module. In one aspect, such a transfer of fluid can be accomplished via fluidics tubes or channels that are fluidically coupled from the fluid reservoir to the standardized fluid input. In one aspect, the input fluid controller can be a pumping mechanism. A variety of pumping mechanisms can be utilized to perform the various pumping functions of the present invention. Also, a plurality of pumping mechanisms can be utilized to perform the various pumping functions of the present invention. Non-limiting examples of such pumping mechanisms can include peristaltic pumps, syringe pumps, screw pumps, piston pumps, and the like. In another aspect, the transfer of fluid can be discontinuous, as would be the case for systems where the standardized fluid input was an open receptacle and the fluid input controller was a pipette or other discontinuous fluid transfer device. Such a discontinuous fluid transfer system can be facilitated by utilizing a robotic arm attachment in conjunction with the fluidics system. A manifold device can be provided to control the distribution of the fluids in the system. The manifold device can incorporate any of a variety of fluid handling components, such as couplings, channels, fittings, valves, pumps, filters, and the like. A manifold device can provide advantages such as reducing dead volume, reducing part count, providing higher reliability, and improving manufacturability. Other fluid components and functions can be conveniently incorporated into a manifold device, such as flow meters, flow indicators, sensors, such as pH sensors, and the like. A variety of fluids can be delivered using the various fluid input mechanisms and supporting hardware described herein, as well as others known to those of ordinary skill in the art. Examples of such fluids include without limitation, fluids containing samples for processing, (i.e. sample presented in a fluid form) buffer fluids, reagent fluids, wash fluids, etc.

Figure 8:
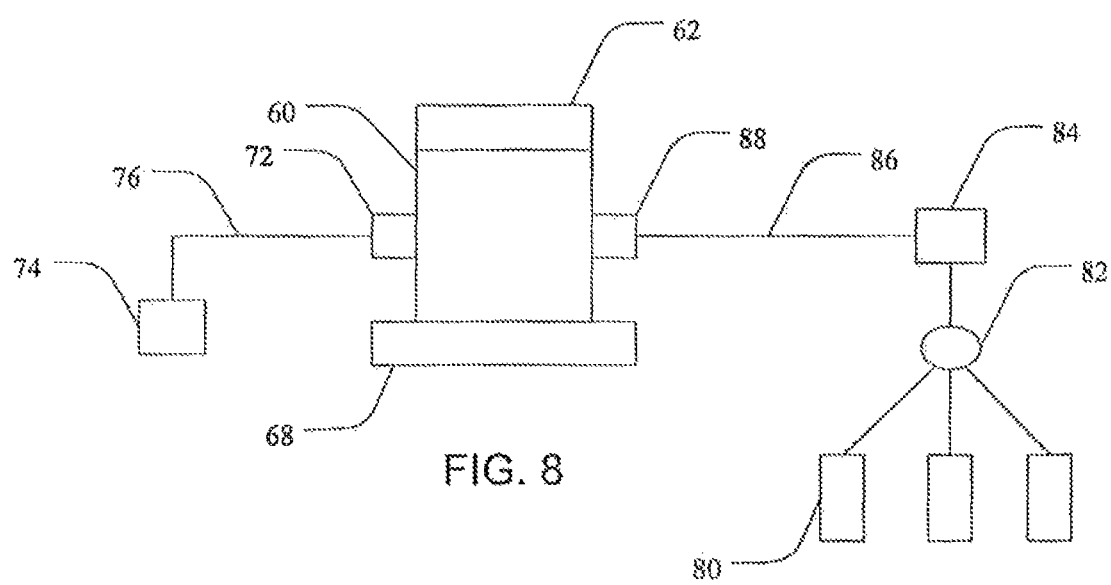
FIG. 8 shows a schematic diagram of a sample processing system and method for performing laboratory protocols in accordance with one embodiment of the present invention.

In one aspect, as is shown in FIG. 8, the input fluidics system can deliver fluids from multiple fluid reservoirs 80. An input fluid distribution valve 82, such as a rotary value, can engage a fluid line from a specific fluid reservoir 80 in order to deliver a particular fluid to the sample processing module 60. The input fluid controller 84 can draw the selected fluid through the input fluid distribution valve 82, through the input fluid line 86 and to the sample processing module 60 via the fluid input 88. A different fluid can be delivered by merely switching the input fluid distribution valve 82 to a different position, thus selecting a different fluid reservoir. Depending on the configuration of the sample processing module, the input fluid line 86 can be a single fluid line or multiple fluid lines. Similarly, the standardized fluid input 88 can be a single input or multiple inputs. Furthermore, additional input fluid distribution valves can be utilized at any point along the fluid line to further distribute the fluid. For example, multiple sample processing modules can provide multiple internal spaces, all having multiple fluid inputs 88. An additional input fluid distribution valve can be placed in the input fluid line 86 allowing any fluid from the multiple fluid reservoirs 80 to be delivered to any of the multiple fluid inputs 88.

Utilizing input and output fluid distribution valves allows fluid to be added and withdrawn from the sample processing module with specific timing and in a specific order. In one aspect, for example, fluid is drawn and delivered to a valve that switches between various fluid lines delivering fluid to the sample processing modules. Thus the delivery of fluid to the sample modules can be accurately timed. The ability to deliver reagent with one pump and withdraw reagent with another pump can be very beneficial in timing reactions occurring in the sample modules. Thus reagent can be sequentially delivered to a plurality of sample modules and subsequently removed following a given incubation time to facilitate a uniform reaction time across all sample modules. It is additionally contemplated that in some cases reaction times may vary between sample modules, yet still be precisely controlled as to incubation time for a given sample module. It is also additionally contemplated that reagent can be sequentially delivered to a plurality of internal spaces within a single sample module and subsequently removed following a given incubation time. It is also additionally contemplated that agitation may be applied at any time during the sequential delivery and removal of any reagent to and from the internal spaces in order to keep any samples or sample inserts wet. Moreover with multiple valve lines running to each module, it is possible to add different fluids into a single sample-processing space within a housing wherein the different fluids are mixed as needed by the agitation provided from the agitation system.

Figure 9:
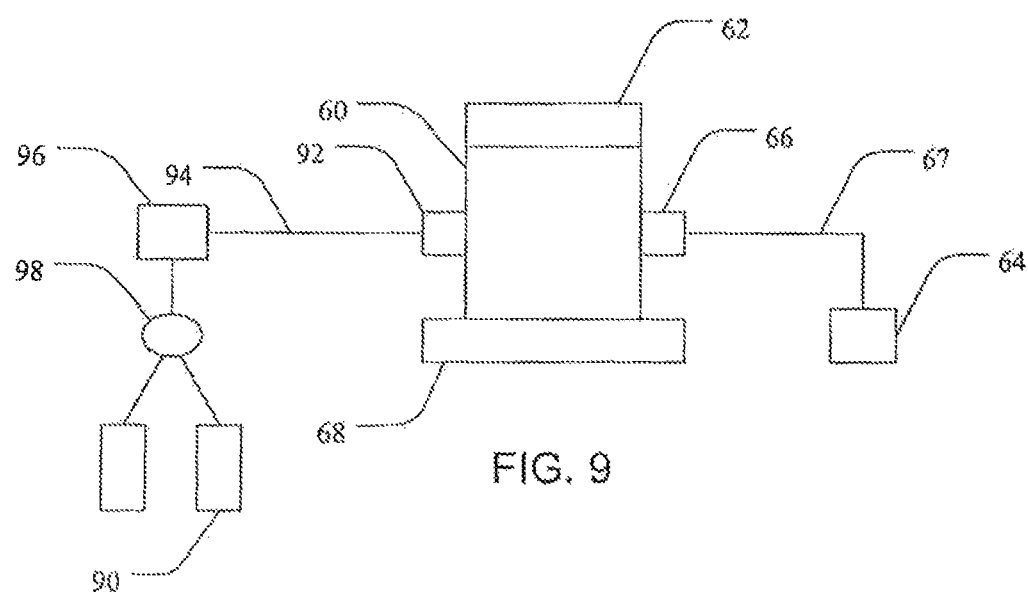
FIG. 9 shows a schematic diagram of a sample processing system and method for performing laboratory protocols including a fluidics system in accordance with one embodiment of the present invention.

In one aspect, as is shown in FIG. 9, the output fluidics system can withdraw fluids from the sample processing module 60, and deliver that fluid to multiple output fluid containers 90. Output fluid can be withdrawn from a fluid output 92, and delivered through a fluid output line 94 by the output fluid controller 96. An output fluid distribution valve 98, such as a rotary value, can be used to select an output fluid container 90 into which the fluid will be transferred. Thus fluids from different sample processes or sample process steps can be partitioned to different output fluid containers. Depending on the configuration of the sample processing module, the output fluid line 94 can be a single fluid line or multiple fluid lines. Similarly, the standardized fluid output 92 can be a single output or multiple outputs. Furthermore, additional fluid distribution valves can be utilized at any point along the fluid line to further distribute the fluid.

Figure 9A:
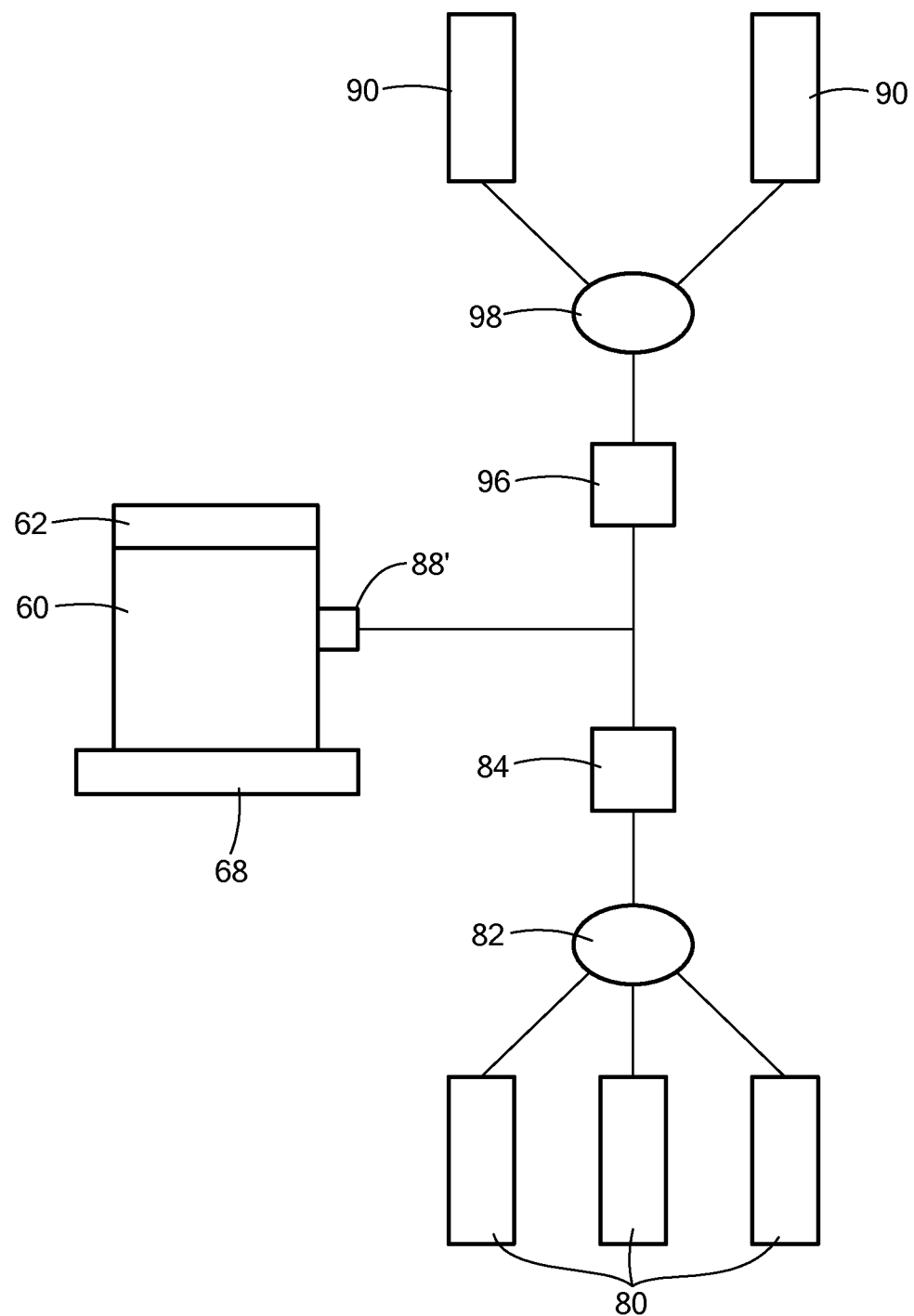
FIG. 9A shows a schematic diagram of a sample processing system and method for performing laboratory protocols including a fluidics system in accordance with one embodiment of the present invention.

FIG. 9A shows a further aspect in which a single fluid connection 88' is provided for both fluid input and output to the processing module 60. Fluid flow through the connection 88' is bi-directional. The fluid input controller 84 and the fluid output controller 96, which can each be, for example, a pumping mechanism, determine whether fluid is delivered into or out of the processing module 60. A manifold device, such as described above, can also be incorporated to provide control of the fluid flow into and out of the system.

Figure 9B:
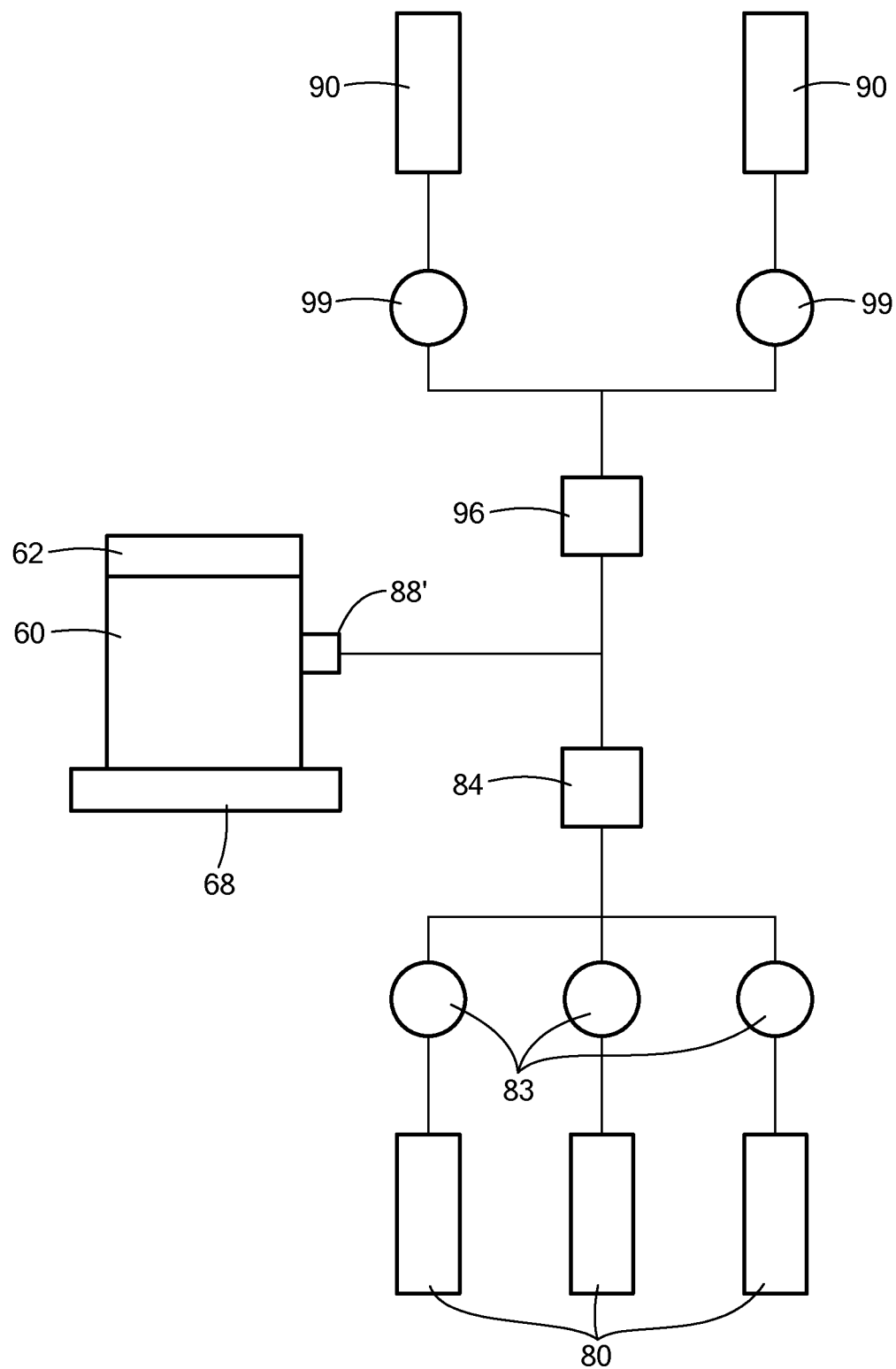
FIG. 9B shows a schematic diagram of a sample processing system and method for performing laboratory protocols including a fluidics system in accordance with one embodiment of the present invention.

FIG. 9B shows a further aspect in which a single input fluid distribution valve 82 is replaced by a plurality of valves 83, each associated with in input fluid reservoir 80. Also, a single output fluid distribution valve 98 is replaced by a plurality of valves 99, each associated with an output fluid container 90. The valves 83 and 99 can be, for example, solenoid valves. A manifold device, such as described above, can also be incorporated to provide control of the fluid flow into and out of the system.

Figure 10:
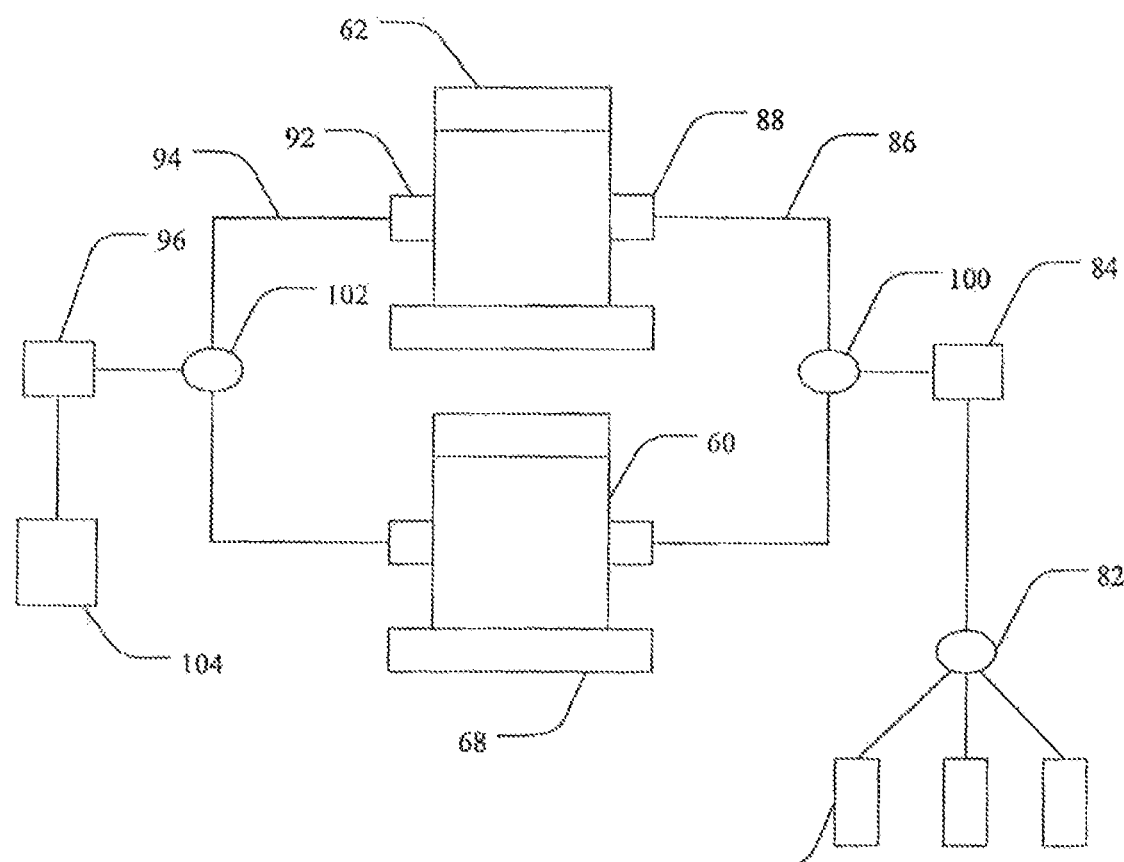
FIG. 10 shows a schematic diagram of a yet another configuration for a modular sample processing system and method for performing laboratory protocols including a fluidics system in accordance with one embodiment of the present invention.

FIG. 10 shows an aspect of the present invention having multiple sample processing modules 60 and multiple fluid reservoirs. In this aspect, an input module fluid distribution valve 100 is utilized to selectively route fluid to each sample processing module. Additionally, an output module fluid distribution valve 102 is utilized to selectively remove fluid from each sample processing module for delivery to a waste container or other output fluid reservoir 104. It should be noted that further distribution of the output fluid is contemplated, similar to what is shown in FIG. 9.

Figure 10A:
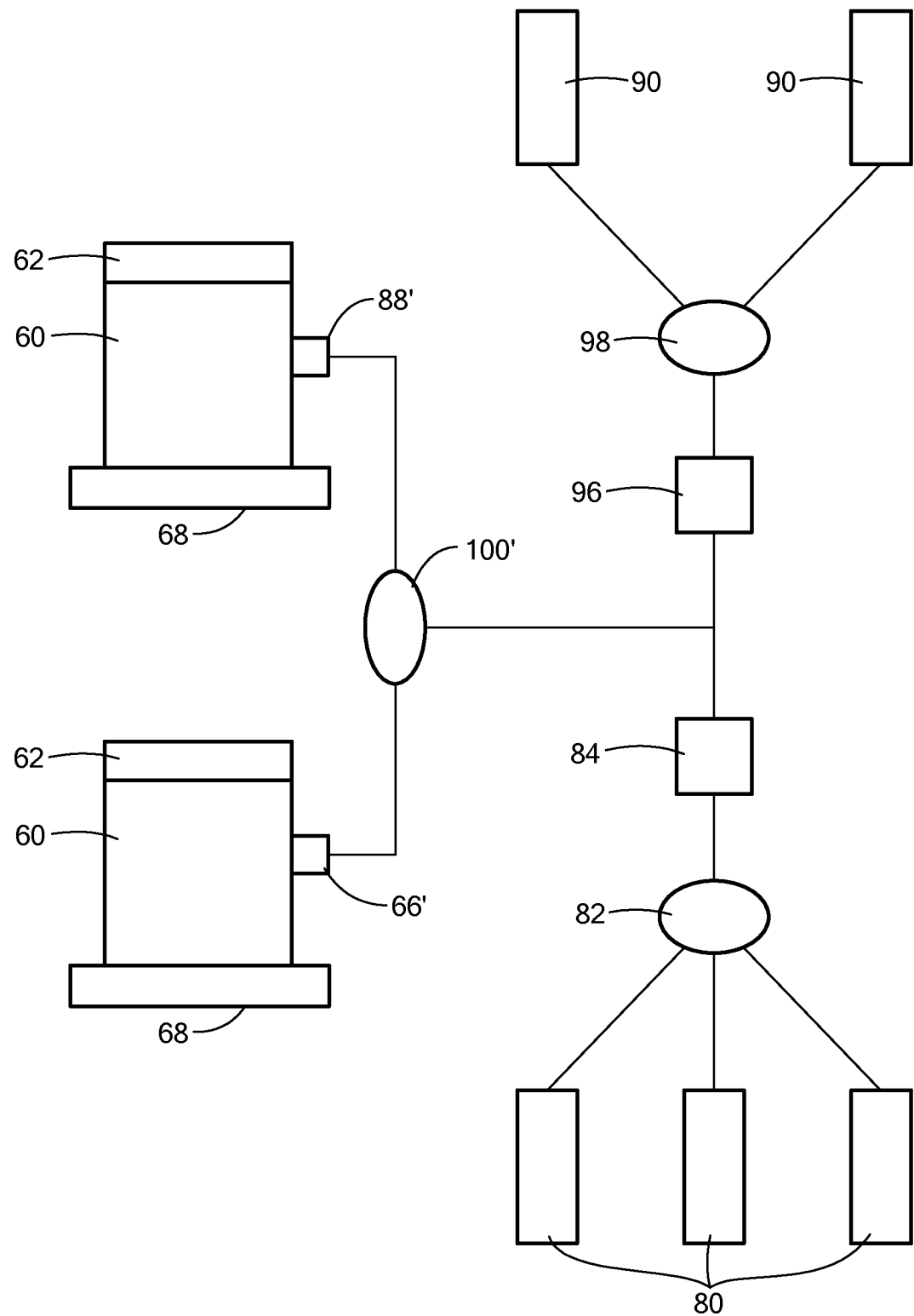
FIG. 10A shows a schematic diagram of a yet another configuration for a modular sample processing system and method for performing laboratory protocols including a fluidics system in accordance with one embodiment of the present invention.

FIG. 10A shows a further aspect in which a single fluid distribution valve 100' is utilized to selectively route fluid both to and from multiple sample processing modules 60. Fluid flow through the valve 100' is bi-directional. The fluid input controller 84 and the fluid output controller 96, which can each be, for example, a pumping mechanism, determine whether fluid is delivered into or out of the multiple processing modules 60 through the valve 100'. It can be appreciated that any suitable number of modules 60 can be provided. A manifold device, such as described above, can also be incorporated to provide control of the fluid flow into and out of the various modules.

Figure 11:
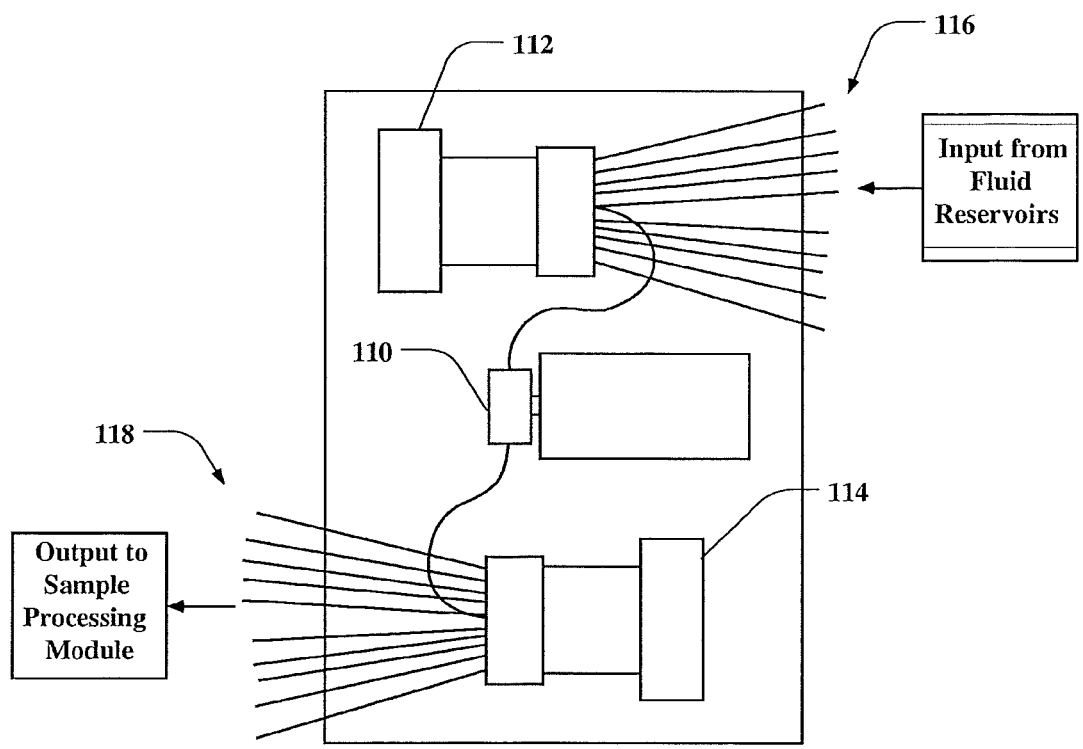
FIG. 11 shows a schematic diagram of input fluidics in accordance with one embodiment of the present invention.

In one aspect of the present invention, as is shown in FIG. 11, an input fluid controller can include a pumping mechanism 110 fluidically coupled to a first fluid distribution valve 112 and a second fluid distribution valve 114. In this configuration, the first fluid distribution valve 112 is positioned to engage a reservoir fluid input line from a plurality of reservoir fluid input lines 116. The plurality of reservoir fluid input lines are coupled to a plurality of fluid reservoirs (not shown) containing the various buffers, washes, reagents, etc. that are to be used for a particular sample process. The second fluid distribution valve 114 is positioned to engage a module fluid input line from a plurality of module fluid input lines 118 that are coupled to a plurality of destination points associated with the sample processing module. A plurality of module fluid input lines can couple to a single sample processing module or multiple sample processing modules. The pumping mechanism 110 can then be engaged to draw a selected fluid through the reservoir fluid input line and through the module fluid input line to the sample processing module. By switching the second fluid distribution valve 114, the selected fluid can be delivered through various of the plurality of module fluid input lines 118 to various sample processing locations. Switching the first fluid distribution valve 112 to another reservoir fluid input line allows subsequent fluids to be drawn from different fluid reservoirs and delivered via the second fluid distribution 114 to the various sample processing locations. In some aspects, the fluid output reservoirs may be the same reservoirs as those connected to the reservoir input lines, effectively creating a fluidics circuit. In such case, fluid removed from the sample processing modules may be recovered and reused if so desired.

Figure 12:
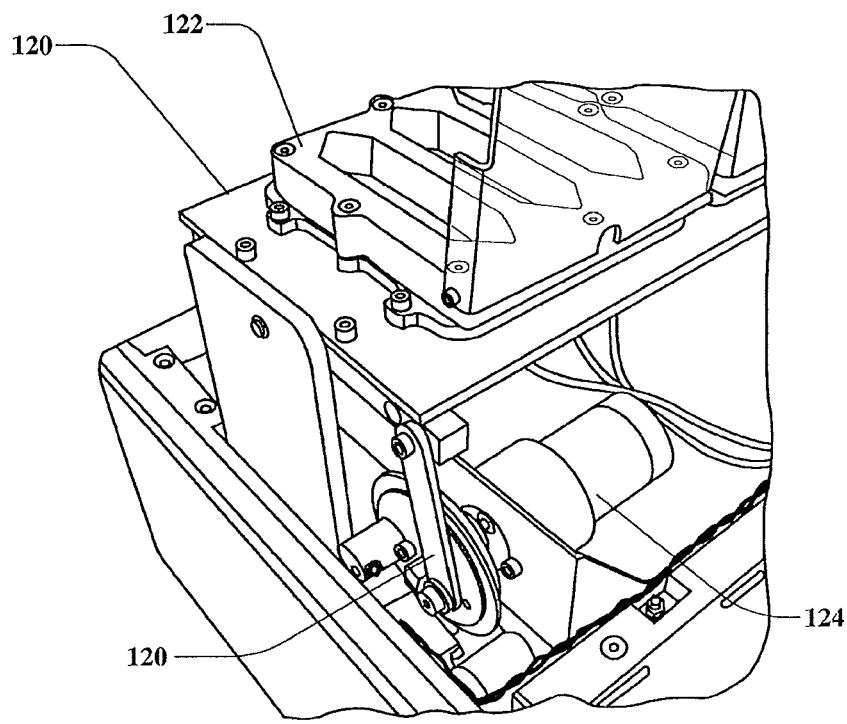
FIG. 12 shows a perspective view of an agitation system in accordance with one embodiment of the present invention.

An agitator can be included in the present systems in order to provide agitation to the sample processing module. The agitator can be any means of agitation known, and can be provided in fixed and variable speeds. In one aspect, as is shown in FIG. 12, the agitator can include a mounting plate 120 for mounting the sample processing module or modules 122. A motor 124 or other motion generating device can be coupled to the mounting plate 120 with an adjustable coupling device 126. The adjustable coupling device 126 can be adjusted to vary the travel of the mounting plate 120 and thus provide a variety of repetitive motions to the sample processing module. Such motions can include vibration, back and forth motion, circular motion, rocking motion, tilting motion, and the like.

The agitator can function in conjunction with the fluidics system in order to facilitate removal of fluid from the sample processing module. For example, a module can be filled with fluid and rocked back and forth to provide agitation to the sample process. To add a fluid, the agitator can move and hold the mounting plate in a substantially horizontal position such that fluid can be dispensed evenly into an internal space. In another aspect, the agitator may tilt and hold the mounting plate downward in the direction of the fluid input while fluid is added. Such motion may be desirable for an analysis where the fluid is to hit the sample in the sample-processing chamber all at the same time, or for the purposes of eliminating bubbles in, or degassing, the fluid. To remove a fluid, the agitator can move to a tilted position such that fluid can accumulate at the standardized fluid output in order to facilitate fluid removal. As an example, a sample processing module can be agitated at a slight rocking tilt, such as 10°, during a wash step. Once the wash is finished, the agitator can tilt the sample processing module to a greater angle, such as 30°, in order to drain the fluid from the module. It should be noted that the angles described in association with agitation are intended to be merely exemplary. As such, various ranges of angles could be used in a similar manner to what is described.

The agitator can be configured to provide a constant back and forth travel, or it can be configured to provide a variable travel. For example, the mounting plate can be rocked with a steeper slope on the forward motion and a lesser slope on the backward motion. Additionally, the mounting plate can be maintained in an angled position to facilitate the removal of fluids from the sample modules. The motor can be a variable speed motor, thus allowing changes in agitation frequency as well as amplitude. Additionally, positional sensors on the motor can allow the mounting plate to be held horizontally to allow even fluid coverage of the samples, or held in an angled position to allow draining.

In one aspect, a single mounting plate can be configured such that multiple sample processing modules can be agitated concurrently. In another aspect, a separate mounting plate can be utilized for each module to allow non-concurrent agitation. Thus laboratory protocols can be run simultaneously that have different agitation steps, or that are spaced in time such that concurrent agitation is not desirable. Also, one sample processing module can be held in a substantially flat position while being filled, or in a tilted position toward the side of the internal space containing the fluid input. Similarly, a separate sample processing module can be held in a substantially flat position while being drained, or in a tilted position toward the side of the internal space containing the fluid output. These actions could be performed simultaneously and sequentially on multiple sample processing units.

The system can further include a control system to facilitate the laboratory protocol steps in the various parts of the system. The control system can regulate temperature, agitation, fluid control, including fluid input and output, and can manage multiple sample processing modules simultaneously. The control system can include a user interface to allow the selection or input of the steps of the laboratory protocol, as well as specific parameters that may be useful for a particular protocol. The control system can also allow user control over some or all of the steps of a laboratory protocol, to all the protocol to be paused, halted, portions repeated, and the like. Such systems are well known, and it would be considered within the skill of one of ordinary skill in the art to implement such a control system in conjunction with the present system. Additionally, it should be noted that the control system can communicate with the various components via wired or wireless communication.

In one aspect of the present invention, the control system can be a software controller. Such a controller can be used to cause the system to perform a laboratory protocol with varying degrees of interaction by a user. For example, in one aspect, the user can merely load samples into sample modules, associate reagents with reagent input fluidics, and start the software controller. The software controller can thus deliver and withdraw reagents, manage timing of reactions, apply proper agitation, heating, cooling, and the like. Numerous software control systems are contemplated, and any such controller or system should be included within the present scope. In one aspect, a laboratory protocol can be set up using a spread sheet program, and such a spread sheet can be used to execute the protocol. In one aspect, for example, the spreadsheet can be saved as a comma or tab delimited file and executed using a program such as Python. In another aspect, for example, the laboratory protocols are entered in a sequential tabular form and saved in a text format.

It is additionally contemplated that the control system can include the ability to notify a system user of the status of a laboratory protocol. For example, the user can place a command in the laboratory protocol that the system notify the user via a text message or email that the laboratory protocol has reached a certain step, or is finishing a certain step, or will need assistance in a given amount of time, etc. The text message or email may also alert the user that a problem or error has occurred in the laboratory protocol, which problem or error would come from a predetermined list of possible problems or errors. Such a text message or email can be sent to the user's mobile device or computer.

The following is a general example of how a sample processing system can function. It should be noted that the steps outlined herein can vary depending on the protocol being performed, and as such, these steps should not be seen as limiting. A user initially obtains reagents that are needed for a particular protocol. The user can place the reagents in containers, or obtain reagent containers having reagents already therein. The user then associates tubes from a reagent valve in the input fluidics module to the appropriate reagent containers. The user can then enter timing, temperature, and agitation motion for each protocol step into a control interface associated with the system. An appropriate sample can be introduced into the sample processing module and the protocol steps can be initiated.

A pump draws a reagent from the assigned reagent container into the tubing that runs from the reagent container through the reagent valve, through the pump, and into the sample valve in the input fluidics system. Excess reagent can be exited through a waste tube in the sample valve. It can be beneficial to clear previous reagent from a fluid line when reagents are changed. As such, when a new reagent is used, a small amount of the new reagent can be drawn through the first valve, through the pump and the second valve into a waste container. This will clear the fluid lines up to the second valve of the previous reagent. Reagent is drawn and dispensed through the sample valve to sequentially fill each sample chamber of the sample module. If heat or cooling is required, a heating module can be activated to raise or lower the temperature of the sample chamber(s). The sample incubates in the reagent for the designated length of time at the required temperature. Agitation can be applied.

The pump can then draw a second reagent from the assigned reagent container to fill the tubing from the assigned reagent container through peristaltic pump and to the sample valve. Excess second reagent exits through waste tube from sample valve. The system continues to draw the second reagent through the sample valve to sequentially fill each sample chamber, thereby displacing the first reagent in each chamber through waste port and tube. A sufficient amount of second reagent is drawn to completely replace the preceding reagent in the sample chambers. The heating module can heat the sample chambers again if required. The sample incubates with the second reagent for the designated length of time at the required temperature. Again, agitation can be utilized. The system continues as described above until the protocol is completed. The user can then remove the sample from the sample processing module when the automated portion of the protocol is complete.

Figure 13:
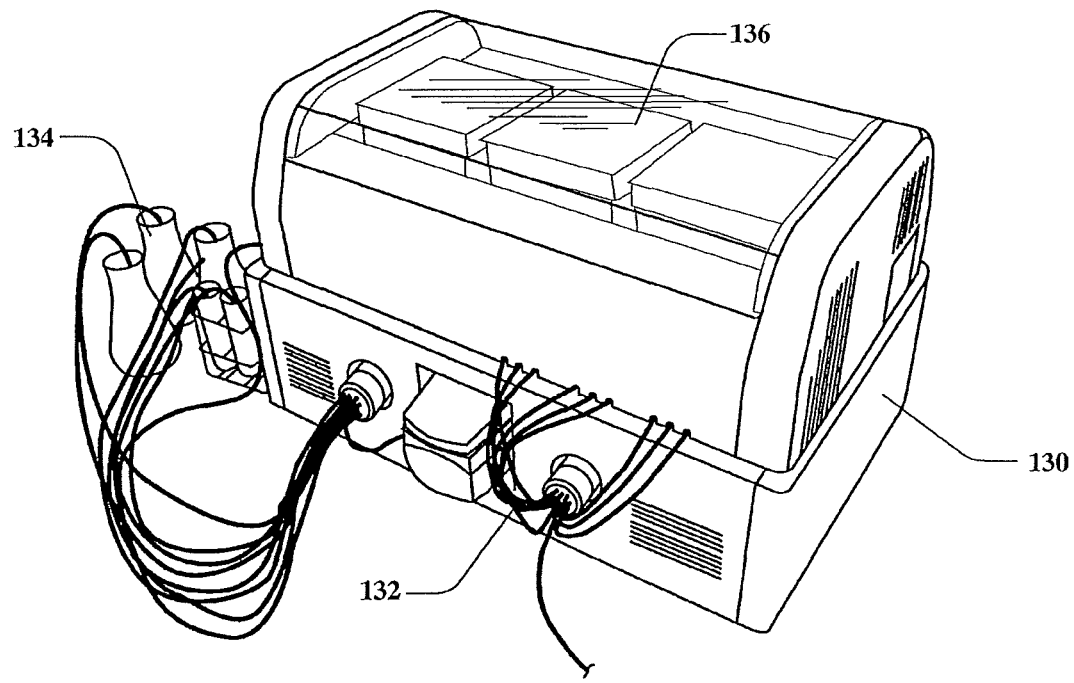
FIG. 13 shows a perspective view of a modular sample processing device and system having three interchangeable sample processing modules in accordance with one embodiment of the present invention.
Figure 14:
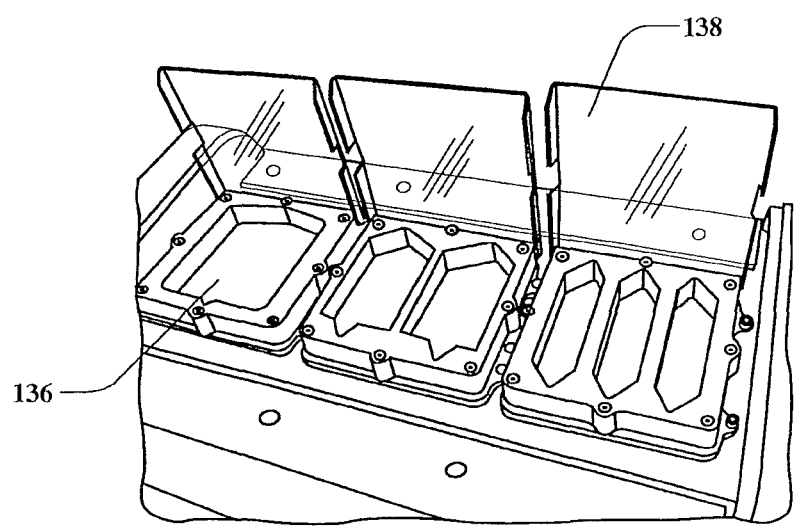
FIG. 14 shows a perspective view of a modular sample processing device and system having three interchangeable sample processing modules in accordance with one embodiment of the present invention.

The following is a general example of a modular sample processing system. It should be noted that detail and structure outlined herein can vary, and as such, these details and structures should not be seen as limiting. Accordingly, FIG. 13 shows a modular system for performing various sample processes. FIG. 13 shows various details of the system, including a housing 130, input fluidics 132, reagent or fluid reservoirs 134, and a lid covering a plurality of sample processing modules 136. Upon removing the lid, various sample processing modules 136 can be seen in FIG. 14. The sample processing modules can include a sample processing module lid 138 to contain liquids during agitation and to reduce evaporation. The lid 138 can be clear as shown, or opaque to protect any light sensitive samples from ambient light. Also, a gasket can be provided between the lid and the sample processing module to further prevent spilling and evaporation.

Figure 15:
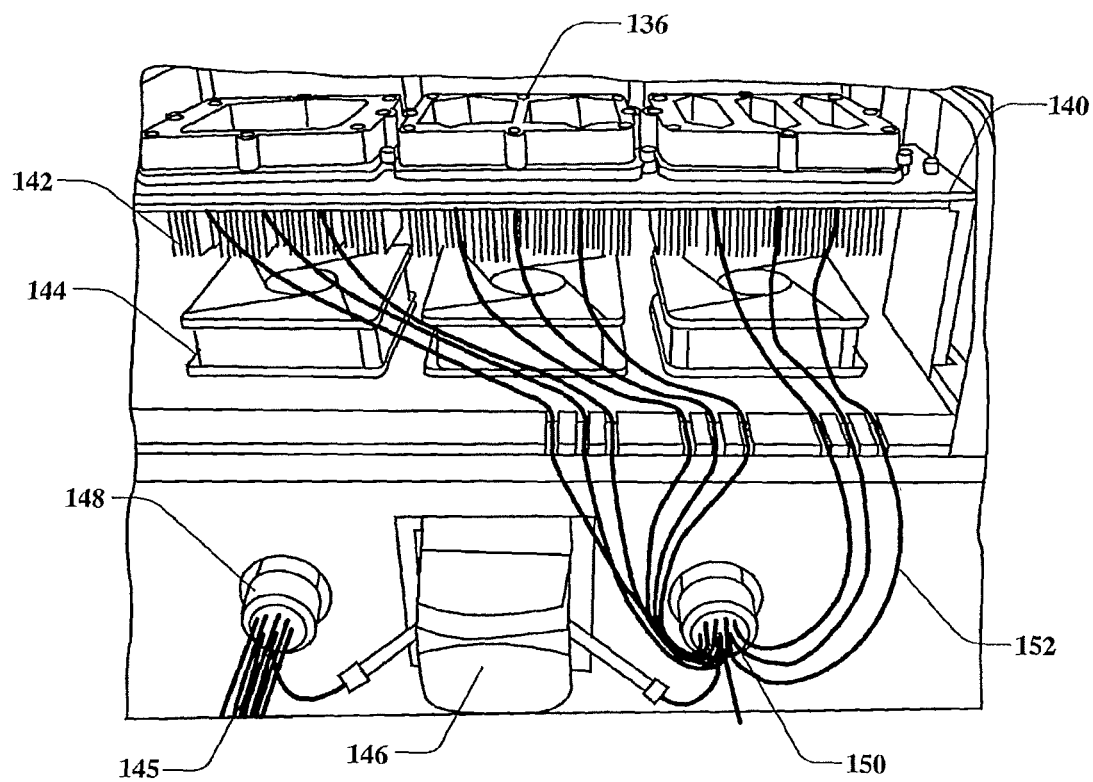
FIG. 15 shows a perspective view of a thermal regulation system and input fluidics of a modular sample processing device and system in accordance with one embodiment of the present invention.
Figure 23:
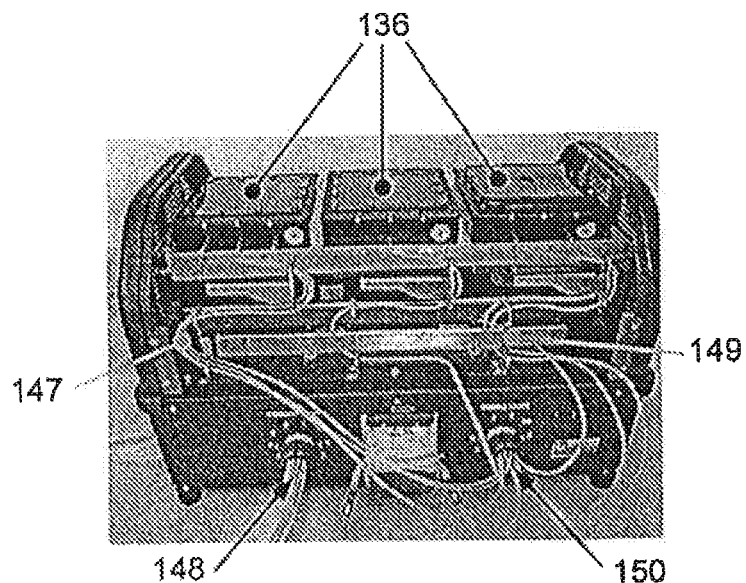
FIG. 23 shows a front view of one embodiment of the system of the present invention, particularly showing one specific embodiment for the input fluidics system and controller.

FIG. 15 shows additional detail of the system. Sample processing modules 136 are secured to a mounting plate 140. A thermal regulation system including thermal fins 142 and Peltier elements (not shown) are associated with the sample processing modules 136. Fans 144 can further facilitate thermal regulation as has been described herein. A pump 146 is coupled to a first rotary valve 148, which is in turn coupled to a plurality of fluid input lines 145 that coupled to a plurality of fluid reservoirs (not shown). The pump 146 is capable of pumping fluid from the first rotary valve 148 to a second rotary valve 150 and through a series of sample fluid lines 152 to the sample processing modules 136. The sample fluid lines are thus coupled to the sample processing modules. The sample fluid lines may also be coupled to the sample processing modules via a flexible support, such as an L-shaped malleable or spring metal that allows the sample fluid lines to move and stretch slightly during agitation, but maintains the sample fluid lines in a position that substantially reduces or prevents wear on the sample fluid lines and possible tangling or disconnection from the sample processing modules. Each sample processing module can have one or more coupled sample fluid lines, depending on the configuration of the modules and the number of internal spaces in each module. FIG. 23 shows an alternate embodiment of the input fluidics system. The tubing lines 147 that fluidly connect the second rotary valve 150 and the samples modules are constrained by an elastic guide bar 149 to allow controlled movement and prevent entanglement during agitation of the sample modules.

Figure 16:
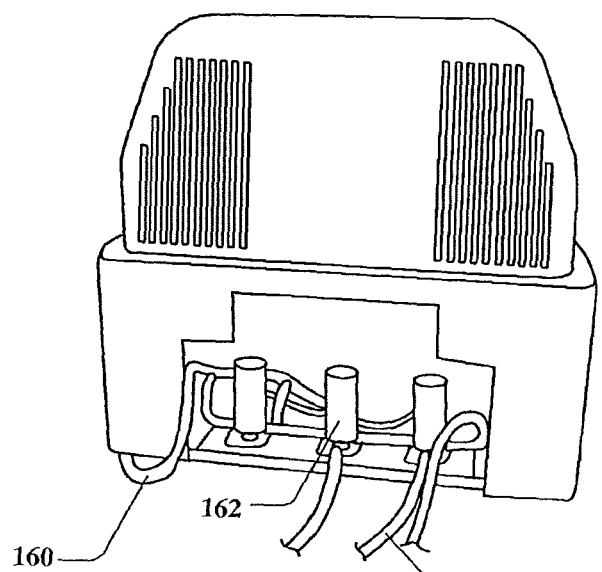
FIG. 16 shows a perspective view of output fluidics of a sample processing device and system in accordance with one embodiment of the present invention.
Figure 24:
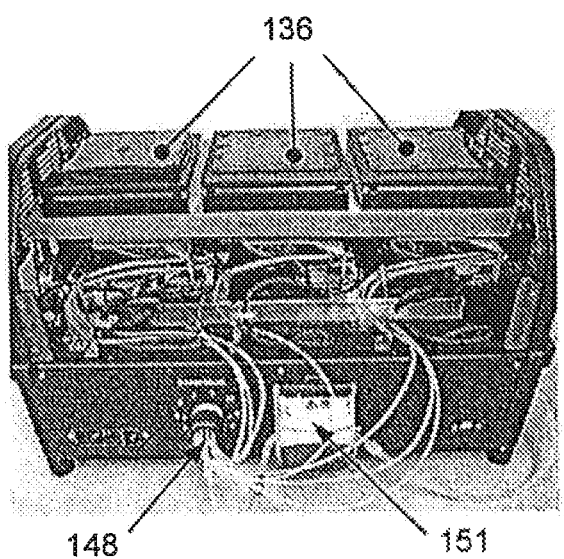
FIG. 24 shows a rear view of one embodiment of the system of the present invention, particularly showing one embodiment for the output fluidics system and controller.

FIG. 24 show output fluid system. A pump 151 similar to that shown in FIG. 15, can couple with a rotary valve 148 to selectively remove fluids from the sample processing modules. This output fluid from the pump 151 can be transmitted through an output fluid line 160 shown in FIG. 16 to one or more waste distribution valves 162. The waste distribution valves 162 can be used to distribute output fluid to one or more waste reservoirs (not shown) via waste fluidic lines 164. Waste fluids can thus be sorted and distributed by the rotary valve and the waste distribution valves 162 into appropriate waste reservoirs for disposal or further use. For example, organics can be sorted to one reservoir, while non-organic waste can be sorted to another. In those aspects having a single waste reservoir, the output fluid can be sent directly to the single waste reservoir from the pump without the need for waste distribution valves 162.

Figure 17:
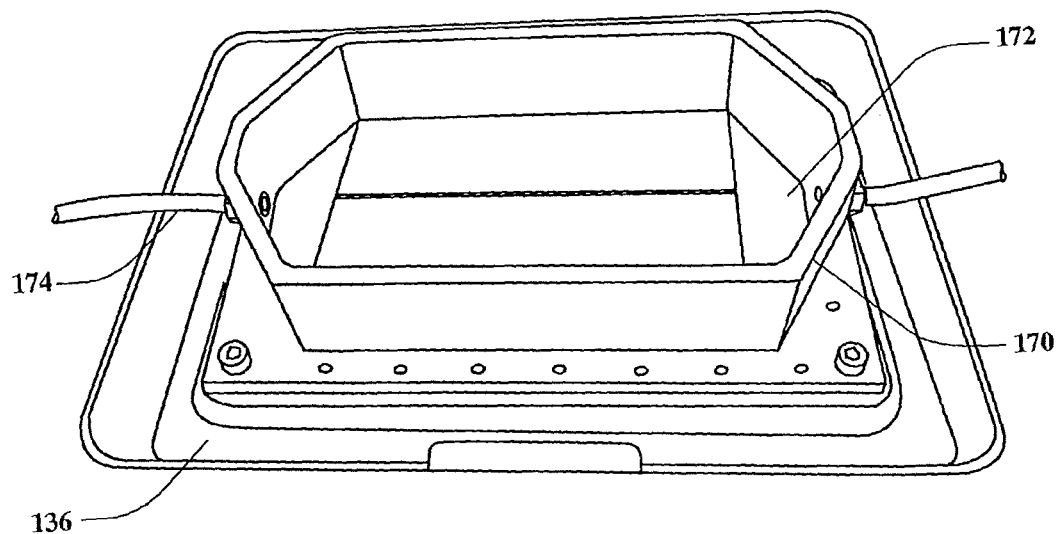
FIG. 17 shows a perspective view of a sample processing module of a sample processing device and system in accordance with one embodiment of the present invention.

As has been described, the present system can include a variety of sample processing module inserts and devices that can facilitate sample processing. FIG. 17 shows, for example, a sample processing module 170 having an internal space 172 containing two microscope slides. FIG. 17 shows the output fluidic line 174 for removing waste from the module. Additionally, an overflow channel 176 is shown around the sample processing module 170 to catch spilled fluid. An output (not shown) from the overflow channel can empty passively or actively to a waste container.

Figure 18:
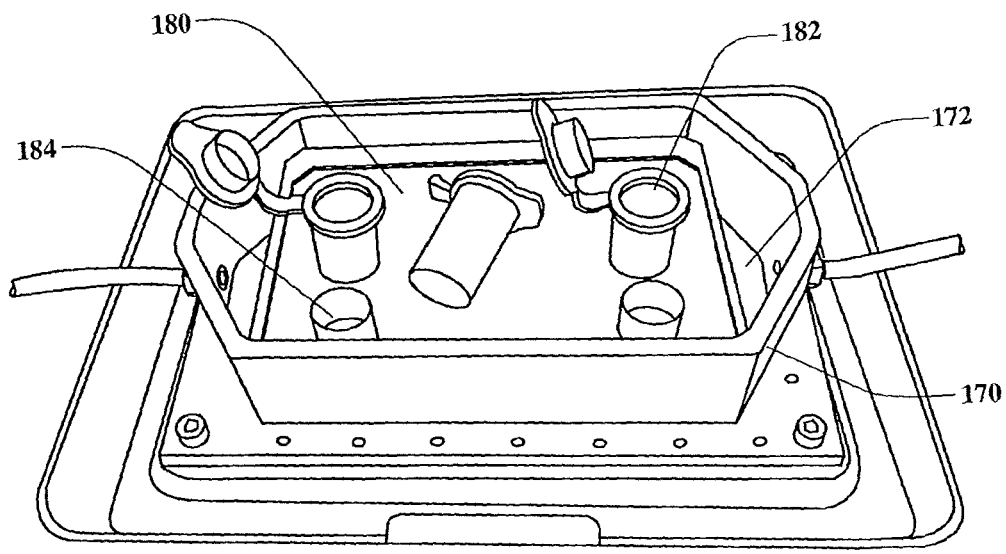
FIG. 18 shows a perspective view of a sample processing module of a sample processing device and system in accordance with one embodiment of the present invention.
Figure 22:
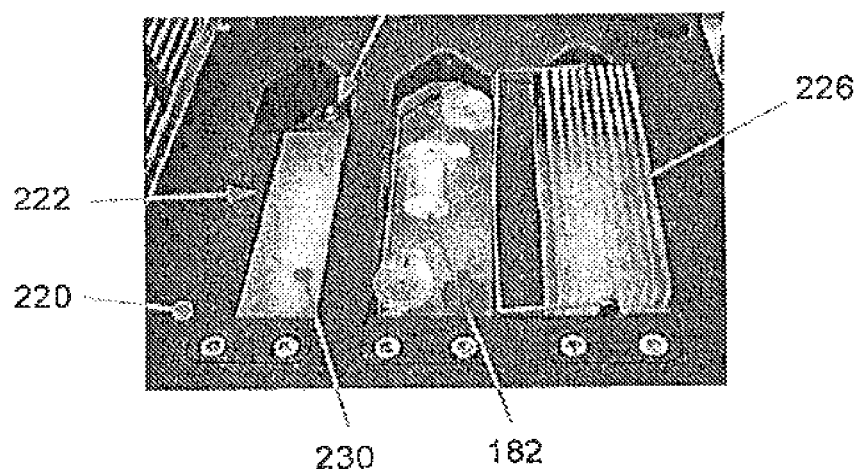
FIG. 22 shows a perspective view of a sample processing module with three sample processing chambers, each configured for a different analysis the chamber on the left configured to accommodate blots, the middle chamber configured to perform a WISH analysis, and the chamber on the right configured to accommodate slides which are held vertically in the sample chamber.

FIG. 18 shows the sample processing module 170 of FIG. 17 having a WISH basket insert 180 located in the internal space 172. The WISH basket insert 180 is configured to hold one or more WISH baskets 182 in one or more holes 184 present in the insert. The holes allow the fluid in the internal space 172 to reach the WISH basket 182 as has been described herein. WISH baskets 182 are also shown in FIG. 22.

Figure 20:
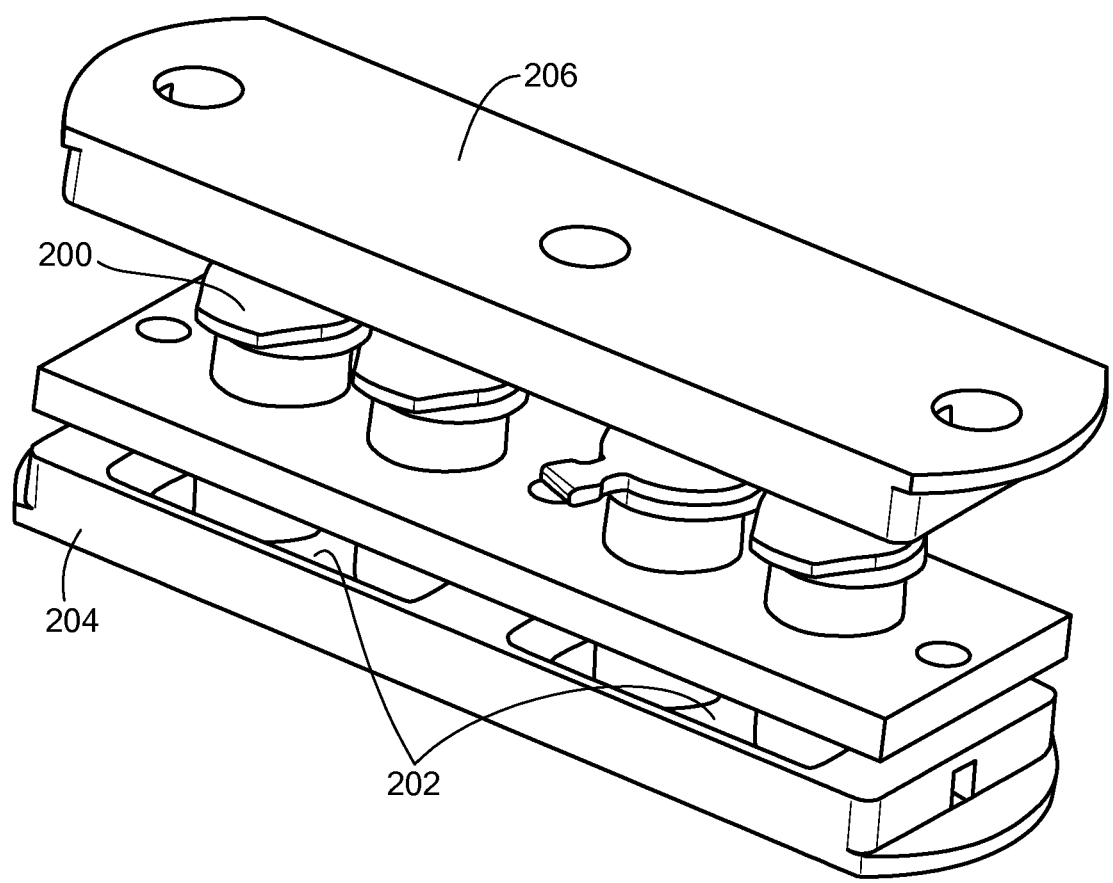
FIG. 20 shows a perspective view of a basket clamp device in accordance with one embodiment of the present invention.

For some steps such as the hybridization, however, the fluid used in WISH can be very valuable and as such it may be desirable to use as little as possible (e.g. 100 μl). Accordingly, for such fluid-saving steps, the liquid may not be pumped through the system but rather would be added manually to the WISH basket. Such manual addition can be facilitated by capping the bottom of the WISH basket. In one aspect, the bottom of the WISH basket can be sealed or clamped with a material such as Parafilm®. FIG. 20 shows such a clamping device. Thus the sample and the hybridization fluid can be added to the basket 200. A Parafilm® 202 or other similar material can be placed in a base portion 204 of the clamp, and a cap portion 206 can be used to clamp the device together and provide sufficient pressure to seal the baskets with the Parafilm®.

Figure 19:
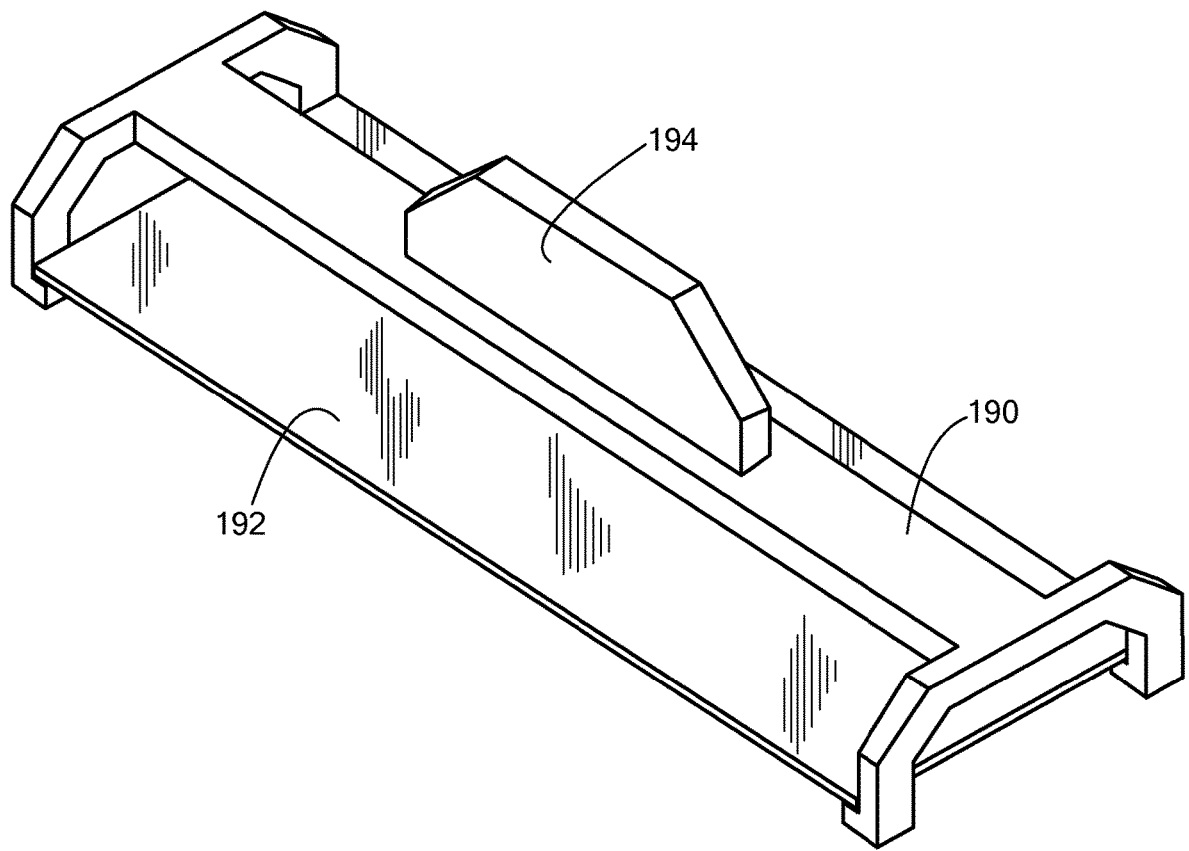
FIG. 19 shows a perspective view of a microscope slide carrier in accordance with one embodiment of the present invention.

In another aspect, as is shown in FIG. 19, a slide carrier 190 can be used to couple to a microscope slide 192 to facilitate transport and use. A handle 194 can be coupled to the slide carrier to further facilitate handling. The slide carrier 190 can be configured to allow a space to be formed between the sample processing module and the microscope slide 192 to allow fluid to more readily flow across the bottom surface of the slide. In this manner the slide can be processed with the sample material located on the slide being oriented downward. This allows the sample material to be more fully immersed in the fluid and can reduce splashing turbulence that can occur on the surface of the fluid from contacting the sample material.

Figure 19A:
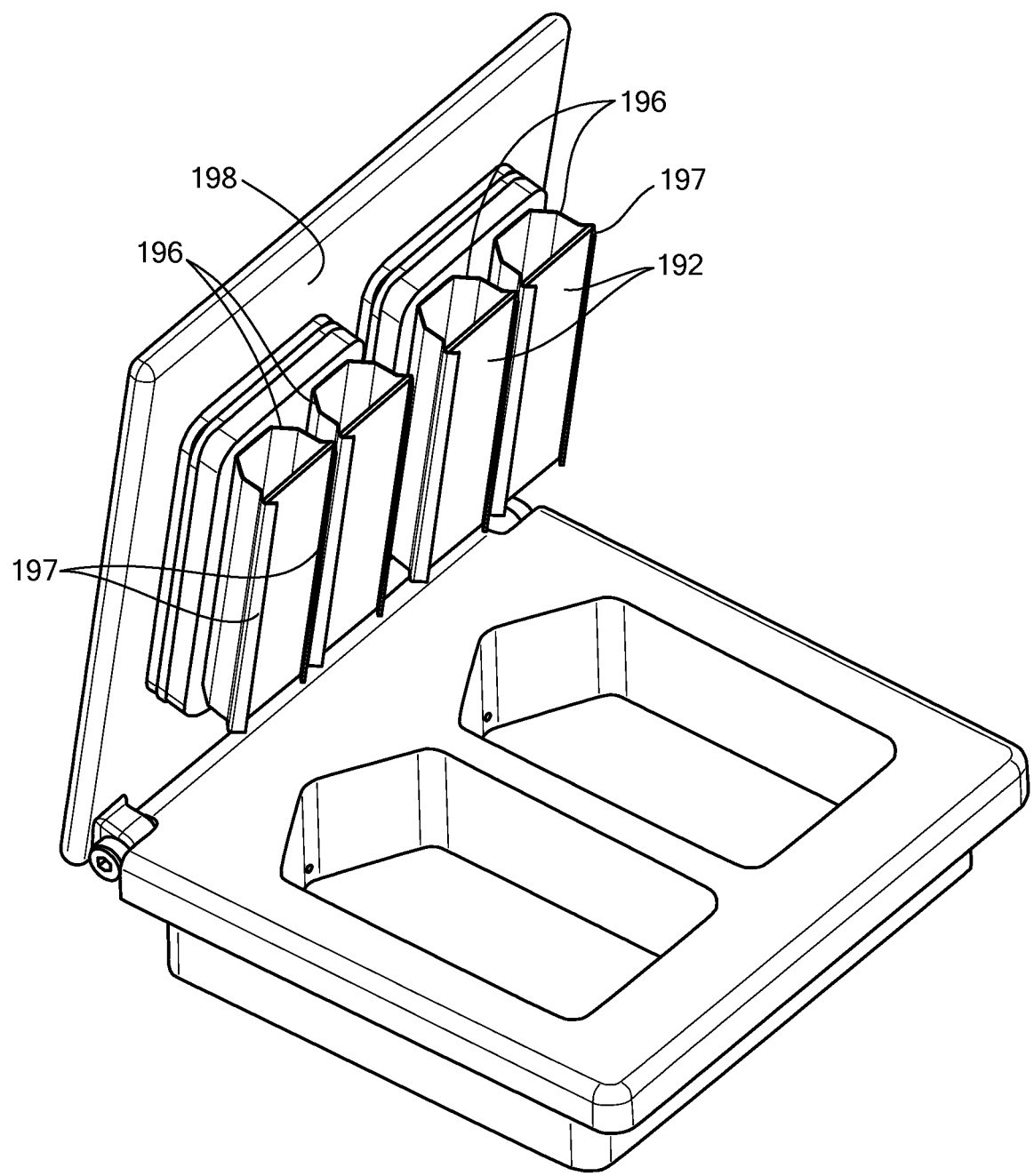
FIG. 19A shows a perspective view of a microscope slide carrier in accordance with one embodiment of the present invention.

In a further aspect, as is shown in FIG. 19A, a slide carrier, configured as a slide holder/clip 196, is provided that can be attached to a module/chamber cover 198. The slide carrier 196 can be permanently attached to the cover 198 or can be removable to allow the slide to be transported between modules, to another device, etc. The clip 196 is made of a springy or resilient material, such as spring stainless steel or a resilient plastic, to allow a slight spring force to be applied to the edges of the slide 192 to hold it in place in the clip. The edges 197 of the clip are sized to position the slide at an optimum distance beneath the fluid in the bottom of the module or with respect to the bottom of the module. Optionally, the clip does not need to be attached to the cover 198 at all; the clip can also rest on the bottom of the module, as with the carrier 190 illustrated in FIG. 19.

Figure 21:
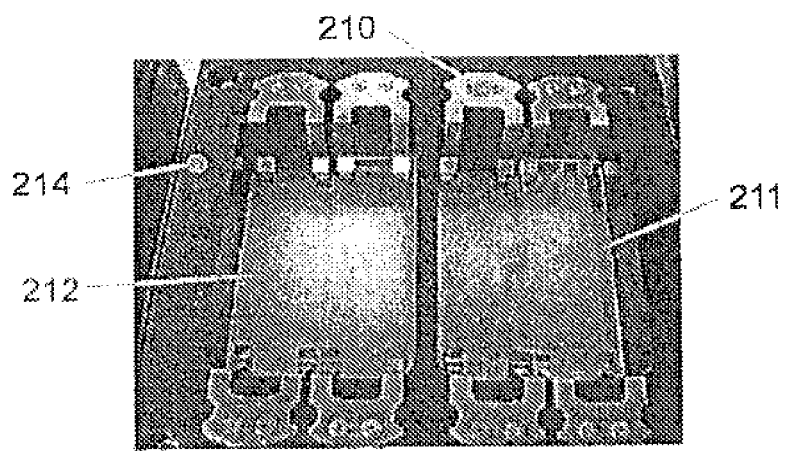
FIG. 21 shows a perspective view of a sample processing module that has pairs of sample holder clip devices in accordance with one embodiment of the present invention.

In another aspect, as is shown in FIG. 21, at least one pair of slide holder clips 210 can be used to secure a microscope slide (not shown) inside the internal space 211, 212 of a sample processing module 214. The slide holder clips 210 can extend down into the internal space 211, 212 and can be configured to engage and hold each end of a microscope slide such that the slide is oriented substantially parallel to the bottom of the internal space. It is also considered that the slide holder clips 210 can extend downward more than half of the depth of the internal space 211, 212 and hold and position the microscope slide at a position that is closer to the bottom of the internal space than the top of the internal space. It is also considered that the slide holder clips may be tapered toward one another and engage and hold the microscope slide between them with a friction fit, and in some cases, a spring or spring-like action. As is also shown in FIG. 21, a plurality of sample holder clips may be attached to the sample processing module such that multiple pair of sample holder clips are within a single internal space and can hold multiple microscope slides within the same internal space.

In another embodiment FIG. 22, the slide can be oriented vertically 226 and be held in place by an insert that rests within the chamber 222 of the sample module 220.

The modules 214, 220 can also accommodate blots 230, which require similar biochemical processing steps as slides and WISH samples.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for performing a first laboratory protocol and a second different laboratory protocol, comprising:
a first sample processing module including a first sample processing module housing defining a first sample processing module internal space for receiving a first sample, a first sample processing module fluid port in communication with the first sample processing module internal space, and a first sample processing module thermally conductive heat spreader;
a second sample processing module including a second sample processing module housing defining a second sample processing module internal space for receiving a second sample, a second sample processing module fluid port in communication with the second sample processing module internal space, and a second sample processing module thermally conductive heat spreader;
at least one temperature control element coupled to the first sample processing module thermally conductive heat spreader and to the second sample processing module thermally conductive heat spreader;
a temperature controller interfaced with the at least one temperature control element for regulating a first temperature of the first sample processing module internal space and for regulating a second temperature of the second sample processing module internal space;
a fluid controller having a first fluidic connection fluidically coupled to the first sample processing module fluid port and a second fluidic connection fluidically coupled to the second sample processing module fluid port, the fluid controller configured:
to deliver a fluid to the first sample processing module internal space and to the second sample processing module internal space; and
to drain the fluid from the first sample processing module internal space via the first fluidic connection, and from the second sample processing module internal space via the second fluidic connection;
an agitator including a single mounting plate mechanically coupled to the first sample processing module and to the second sample processing module;
wherein the first sample processing module and the second sample processing module are configured so as to be interchangeably mountable to the agitator, and wherein the first fluidic connection and the second fluidic connection are each separately connectable to the first sample processing module fluid port and the second sample processing module fluid port; and
a control system interfaced with the temperature controller, the fluid controller, and the agitator, and configured to cause the first laboratory protocol to be performed in the first sample processing module and to cause the second different laboratory protocol to be performed in the second sample processing module, the control system configured to:
control the temperature controller to establish temperatures of the first sample processing module internal space and of the second sample processing module internal space,
control the fluid controller to deliver a first fluid to the first sample processing module internal space and to deliver a second fluid to the second sample processing module internal space,
control the fluid controller to drain the first fluid from the first sample processing module internal space and to drain the second fluid from the second sample processing module internal space,
control the agitator to tilt and hold the first sample processing module and the second sample processing module during a first time interval and to agitate the first sample processing module and the second sample processing module during a second time interval in accordance with the first laboratory protocol, and
control the agitator to tilt and hold the first sample processing module and the second sample processing module during a third time interval and to agitate the first sample processing module and the second sample processing module during a fourth time interval in accordance with the second different laboratory protocol.

2. The system of claim 1, wherein controlling the agitator to agitate the first sample processing module and the second sample processing module comprises causing the agitator to perform at least one of a vibratory motion, a repetitive circular motion, a repetitive rocking motion and a repetitive tilting motion.

3. The system of claim 1, wherein the agitator is operative to tilt and hold the first sample processing module in a tilted orientation such that the first fluid can accumulate at the first sample processing module fluid port while the first fluid is being delivered to the first sample processing module internal space.

4. The system of claim 1, wherein the agitator is operative to tilt and hold the first sample processing module in a tilted orientation such that the first fluid can accumulate at the first sample processing module fluid port during removal of the first fluid from the first sample processing module internal space.

5. The system of claim 1, wherein the fluid controller further comprises:
a first fluid distribution valve in fluid connection with a plurality of input fluid reservoirs;
a fluid pump; and
a second fluid distribution valve in fluid connection with the fluid pump, the first sample processing module fluid port and the second sample processing module fluid port,
said fluid pump being configured to move fluid along a fluid pathway from at least one of the plurality of input fluid reservoirs through the first fluid distribution valve, from the first fluid distribution valve through the fluid pump to the second fluid distribution valve, and from the second fluid distribution valve to each of the first sample processing module fluid port and the second sample processing module fluid port.

6. The system of claim 5, wherein the fluid pathway between the first fluid distribution valve and the fluid pump is a first single fluid line, and
wherein the fluid pathway between the fluid pump and the second fluid distribution valve is a second different single fluid line.

7. The system of claim 1, wherein the control system includes an input interface configured to receive and store data defining each of the first laboratory protocol and the second different laboratory protocol in at least one of a sequential tabular form and a text format.

8. The system of claim 1, wherein the control system is configured and operative to transmit a text message to a user to notify the user of a status of each of the first laboratory protocol and the second different laboratory protocol.

9. The system of claim 1 wherein the first sample processing module includes at least one insert for supporting the first sample.

10. The system of claim 9 wherein the at least one insert includes at least one insert configured to securely retain a microscope slide, a microarray, a sample basket, a blot, a filter, or an ELISA insert during the performance of the first laboratory protocol.

11. The system of claim 1 wherein the first laboratory protocol includes at least one of in situ hybridization, Western blots, Northern blots, Southern blots, slide processing, immunohisto chemistry reactions, histopathology reactions, antibody assays, gel electrophoresis, restriction analysis, ligation, labeling, filter-based assays, fluorescent in situ hybridization, whole mount in situ hybridization, or a combination of two or more of the above.

12. The system of claim 1, wherein the at least one temperature control element comprises a first temperature control element coupled to the first sample processing module thermally conductive heat spreader and a second temperature control element coupled to the second sample processing module thermally conductive heat spreader.

13. The system of claim 1, wherein the first sample processing module thermally conductive heat spreader comprises a thermally conductive material covering an area of the first sample processing module housing.

* * * * *